(12) United States Patent
LePoudre et al.

(10) Patent No.: US 10,962,252 B2
(45) Date of Patent: Mar. 30, 2021

(54) THREE-FLUID LIQUID TO AIR MEMBRANE ENERGY EXCHANGER

(71) Applicant: Nortek Air Solutions Canada, Inc., Saskatoon (CA)

(72) Inventors: Philip Paul LePoudre, Saskatoon (CA); Davood Ghadiri Moghaddam, Portland, OR (US); Manfred Gerber, Saskatoon (CA)

(73) Assignee: Nortek Air Solutions Canada, Inc., Saskatoon (CA)

( * ) Notice: Subject to any disclaimer, the term of this patent is extended or adjusted under 35 U.S.C. 154(b) by 0 days.

(21) Appl. No.: 15/739,016

(22) PCT Filed: Jun. 24, 2016

(86) PCT No.: PCT/IB2016/053799
§ 371 (c)(1),
(2) Date: Dec. 21, 2017

(87) PCT Pub. No.: WO2016/207864
PCT Pub. Date: Dec. 29, 2016

(65) Prior Publication Data
US 2018/0187918 A1 Jul. 5, 2018

Related U.S. Application Data

(60) Provisional application No. 62/185,439, filed on Jun. 26, 2015.

(51) Int. Cl.
*F24H 3/02* (2006.01)
*F24F 12/00* (2006.01)
(Continued)

(52) U.S. Cl.
CPC .............. *F24F 12/002* (2013.01); *F24F 3/14* (2013.01); *F24F 3/147* (2013.01); *F24F 3/1417* (2013.01);
(Continued)

(58) Field of Classification Search
CPC .. F28F 9/026; F28F 12/002; F28F 3/14; F28F 3/1417; F28F 3/147; F28D 9/0031;
(Continued)

(56) References Cited

U.S. PATENT DOCUMENTS

| 1,015,831 A | 1/1912 | Pielock et al. |
| 2,186,844 A | 1/1940 | Smith |

(Continued)

FOREIGN PATENT DOCUMENTS

| AU | 2011286700 A1 | 12/2012 |
| CA | 2283089 A1 | 11/2000 |

(Continued)

OTHER PUBLICATIONS

"International Application Serial No. PCT/IB2016/053799, International Preliminary Report on Patentability dated Jan. 4, 2018", 8 pgs.

(Continued)

*Primary Examiner* — Davis D Hwu
(74) *Attorney, Agent, or Firm* — Schwegman Lundberg & Woessner, P.A.

(57) ABSTRACT

Systems and methods are disclosed herein for a three-fluid liquid-to-air membrane energy exchanger (LAMEE) to condition air (a first overall fluid). A liquid panel assembly used in the LAMEE can include a first fluid circuit for a first cooling fluid (a second overall fluid) and a second fluid circuit for a second cooling fluid (a third overall fluid). The first cooling fluid, also referred to herein as a desiccant, can be configured to circulate through the liquid panel assembly (Continued)

and condition an air stream passing through the LAMEE. The second cooling fluid, also referred to herein as a coolant, can be configured to also circulate through the panel assembly and reject heat from the first cooling fluid. The second cooling fluid can increase the cooling capacity and overall performance of the LAMEE. The first and second cooling fluids can be separate from each other during circulation through the panel assembly. Low operating pressures of the first fluid circuit can be facilitated by the design of the liquid panel to at least partially offset hydrostatic pressure gain with friction pressure loss of the first cooling fluid.

19 Claims, 12 Drawing Sheets

(51) Int. Cl.
    *F24F 3/14*     (2006.01)
    *F28D 9/00*     (2006.01)
    *F28D 21/00*     (2006.01)
    *F24F 3/147*     (2006.01)
    *B23P 15/26*     (2006.01)

(52) U.S. Cl.
    CPC ......... *F28D 9/0031* (2013.01); *F28D 9/0062* (2013.01); *F28D 21/0015* (2013.01); *B23P 15/26* (2013.01); *F24F 2003/1435* (2013.01)

(58) Field of Classification Search
    CPC .... F28D 9/0062; F28D 21/0015; B23P 15/26; F24F 2003/1435
    USPC .......................................................... 165/54
    See application file for complete search history.

(56) References Cited

U.S. PATENT DOCUMENTS

| | | |
|---|---|---|
| 2,290,465 A | 7/1942 | Crawford et al. |
| 2,562,811 A | 7/1951 | Muffly |
| 2,946,201 A | 7/1960 | Munters |
| 2,968,165 A | 1/1961 | Gunnar |
| 3,009,684 A | 11/1961 | Georg |
| 3,018,231 A | 1/1962 | Valentine et al. |
| 3,144,901 A | 8/1964 | Meek |
| 3,247,679 A | 4/1966 | Gershon |
| 3,291,206 A | 12/1966 | Peter |
| 3,401,530 A | 9/1968 | Gershon |
| 3,467,072 A | 9/1969 | Toesca |
| 3,735,559 A | 5/1973 | Salemme |
| 4,113,004 A | 9/1978 | Rush et al. |
| 4,180,985 A | 1/1980 | Northrup, Jr. |
| 4,233,796 A | 11/1980 | Mazzoni et al. |
| 4,235,081 A | 11/1980 | Dowling |
| 4,257,169 A | 3/1981 | Pierce |
| 4,259,849 A | 4/1981 | Griffiths |
| 4,380,910 A | 4/1983 | Hood et al. |
| 4,474,021 A | 10/1984 | Harband |
| 4,538,426 A | 9/1985 | Bock |
| 4,594,860 A | 6/1986 | Coellner et al. |
| 4,700,550 A | 10/1987 | Rhodes |
| 4,719,761 A | 1/1988 | Cromer |
| 4,723,417 A | 2/1988 | Meckler |
| 4,729,428 A | 3/1988 | Yasutake et al. |
| 4,729,774 A | 3/1988 | Cohen et al. |
| 4,841,733 A | 6/1989 | Dussault et al. |
| 4,887,438 A | 12/1989 | Meckler |
| 4,900,448 A | 2/1990 | Bonne et al. |
| 4,905,479 A | 3/1990 | Wilkinson |
| 4,909,810 A | 3/1990 | Nakao et al. |
| 4,930,322 A | 6/1990 | Ashley et al. |
| 4,936,107 A | 6/1990 | Kitagaki et al. |
| 4,939,906 A | 7/1990 | Spatz et al. |
| 4,941,324 A | 7/1990 | Peterson et al. |
| 4,982,575 A | 1/1991 | Besik |
| 5,003,961 A | 4/1991 | Besik |
| 5,020,334 A | 6/1991 | Wilkinson |
| 5,022,241 A | 6/1991 | Wilkinson |
| 5,120,445 A | 6/1992 | Colman |
| 5,148,374 A | 9/1992 | Coellner |
| 5,170,633 A | 12/1992 | Kaplan |
| 5,176,005 A | 1/1993 | Kaplan |
| 5,181,387 A | 1/1993 | Meckler |
| 5,191,771 A | 3/1993 | Meckler |
| 5,297,398 A | 3/1994 | Meckler |
| 5,311,929 A | 5/1994 | Verret |
| 5,325,676 A | 7/1994 | Meckler |
| 5,337,574 A | 8/1994 | Dick |
| 5,351,497 A | 10/1994 | Lowenstein |
| 5,353,606 A | 10/1994 | Yoho et al. |
| 5,373,704 A | 12/1994 | Mcfadden |
| 5,387,376 A | 2/1995 | Gasser |
| 5,448,895 A | 9/1995 | Coellner et al. |
| 5,471,852 A | 12/1995 | Meckler |
| 5,482,625 A | 1/1996 | Shimizu et al. |
| 5,496,397 A | 3/1996 | Fischer et al. |
| 5,502,975 A | 4/1996 | Brickley et al. |
| 5,517,828 A | 5/1996 | Calton et al. |
| 5,526,651 A | 6/1996 | Worek et al. |
| 5,542,968 A | 8/1996 | Belding et al. |
| 5,551,245 A | 9/1996 | Calton et al. |
| 5,564,281 A | 10/1996 | Calton et al. |
| 5,579,647 A | 12/1996 | Calton et al. |
| 5,580,369 A | 12/1996 | Belding et al. |
| 5,632,954 A | 5/1997 | Coellner et al. |
| 5,638,900 A | 6/1997 | Lowenstein et al. |
| 5,649,428 A | 7/1997 | Calton et al. |
| 5,650,221 A | 7/1997 | Belding et al. |
| 5,653,115 A | 8/1997 | Brickley et al. |
| 5,660,048 A | 8/1997 | Belding et al. |
| 5,661,983 A | 9/1997 | Groten et al. |
| 5,685,897 A | 11/1997 | Belding et al. |
| 5,701,762 A | 12/1997 | Akamatsu et al. |
| 5,718,286 A | 2/1998 | Damsohn et al. |
| 5,727,394 A | 3/1998 | Belding et al. |
| 5,732,562 A | 3/1998 | Moratalla |
| 5,749,230 A | 5/1998 | Coellner et al. |
| 5,758,508 A | 6/1998 | Belding et al. |
| 5,758,511 A | 6/1998 | Yoho et al. |
| 5,761,915 A | 6/1998 | Rao, Sr. |
| 5,761,923 A | 6/1998 | Maeda |
| 5,791,153 A | 8/1998 | Belding et al. |
| 5,791,157 A | 8/1998 | Maeda |
| 5,816,065 A | 10/1998 | Maeda |
| 5,825,641 A | 10/1998 | Mangtani |
| 5,826,434 A | 10/1998 | Belding et al. |
| 5,826,641 A | 10/1998 | Bierwirth et al. |
| 5,832,736 A | 11/1998 | Yoshioka et al. |
| 5,860,284 A | 1/1999 | Goland et al. |
| 5,890,372 A | 4/1999 | Belding et al. |
| 5,911,273 A | 6/1999 | Brenner et al. |
| 5,931,016 A | 8/1999 | Yoho |
| 5,943,874 A | 8/1999 | Maeda |
| 5,946,931 A | 9/1999 | Lomax et al. |
| 5,950,447 A | 9/1999 | Maeda et al. |
| 5,992,160 A | 11/1999 | Bussjager et al. |
| 6,003,327 A | 12/1999 | Belding et al. |
| 6,018,953 A | 2/2000 | Belding et al. |
| 6,029,462 A | 2/2000 | Denniston |
| 6,029,467 A | 2/2000 | Moratalla |
| 6,050,100 A | 4/2000 | Belding et al. |
| 6,079,481 A | 6/2000 | Lowenstein et al. |
| 6,094,835 A | 8/2000 | Cromer |
| 6,138,470 A | 10/2000 | Potnis et al. |
| 6,141,979 A | 11/2000 | Dunlap |
| 6,145,588 A | 11/2000 | Martin et al. |
| 6,176,101 B1 | 1/2001 | Lowenstein |
| 6,178,762 B1 | 1/2001 | Flax |
| 6,199,388 B1 | 3/2001 | Fischer |
| 6,199,392 B1 | 3/2001 | Maeda |
| 6,237,354 B1 | 5/2001 | Cromer |
| 6,269,650 B1 | 8/2001 | Shaw |
| 6,318,106 B1 | 11/2001 | Maeda |

(56) References Cited

U.S. PATENT DOCUMENTS

| | | | |
|---|---|---|---|
| RE37,464 E | 12/2001 | Meckler | |
| 6,363,218 B1 | 3/2002 | Lowenstein et al. | |
| 6,412,295 B2 | 7/2002 | Weiss et al. | |
| 6,442,951 B1 | 9/2002 | Maeda et al. | |
| 6,494,053 B1 | 12/2002 | Forkosh | |
| 6,497,107 B2 | 12/2002 | Maisotsenko et al. | |
| 6,532,763 B1 | 3/2003 | Gupte | |
| 6,546,746 B2 | 4/2003 | Forkosh et al. | |
| 6,568,466 B2 | 5/2003 | Lowenstein et al. | |
| 6,575,228 B1 | 6/2003 | Ragland et al. | |
| 6,598,862 B2 | 7/2003 | Merrill et al. | |
| 6,635,104 B2 | 10/2003 | Komkova et al. | |
| 6,644,059 B2 | 11/2003 | Maeda et al. | |
| 6,684,649 B1 | 2/2004 | Thompson | |
| 6,709,492 B1 | 3/2004 | Spadaccini et al. | |
| 6,720,990 B1 | 4/2004 | Walker et al. | |
| 6,739,142 B2 | 5/2004 | Korin | |
| 6,745,826 B2 | 6/2004 | Lowenstein et al. | |
| 6,751,964 B2 | 6/2004 | Fischer | |
| 6,800,118 B2 | 10/2004 | Kusunose et al. | |
| 6,841,601 B2 | 1/2005 | Serpico et al. | |
| 6,848,265 B2 | 2/2005 | Lowenstein et al. | |
| 6,854,278 B2 | 2/2005 | Maisotsenko et al. | |
| 6,864,005 B2 | 3/2005 | Mossman | |
| 6,935,416 B1 | 8/2005 | Tsunoda et al. | |
| 6,973,795 B1 | 12/2005 | Moffitt | |
| 6,976,365 B2 | 12/2005 | Forkosh et al. | |
| 6,978,633 B2 | 12/2005 | Yamazaki | |
| 7,000,427 B2 | 2/2006 | Mathias et al. | |
| 7,017,356 B2 | 3/2006 | Moffitt | |
| 7,092,006 B2 | 8/2006 | Walker et al. | |
| 7,093,452 B2 | 8/2006 | Chee et al. | |
| 7,093,649 B2 | 8/2006 | Dawson | |
| RE39,288 E | 9/2006 | Assaf | |
| 7,178,355 B2 | 2/2007 | Moffitt | |
| 7,181,918 B2 | 2/2007 | Reinders et al. | |
| 7,231,967 B2 | 6/2007 | Haglid | |
| 7,269,966 B2 | 9/2007 | Lowenstein et al. | |
| 7,306,650 B2 | 12/2007 | Slayzak et al. | |
| 7,331,376 B2 | 2/2008 | Gagnon et al. | |
| 7,340,906 B2 | 3/2008 | Moffitt | |
| 7,389,646 B2 | 6/2008 | Moffitt | |
| 7,389,652 B1 | 6/2008 | Fair | |
| 7,593,033 B2 | 9/2009 | Walker et al. | |
| 7,602,414 B2 | 10/2009 | Walker et al. | |
| 7,605,840 B2 | 10/2009 | Walker et al. | |
| 7,717,404 B2 | 5/2010 | Hasegawa et al. | |
| 7,719,565 B2 | 5/2010 | Walker et al. | |
| 7,737,224 B2 | 6/2010 | Willis et al. | |
| 7,753,991 B2 | 7/2010 | Kertzman | |
| 7,781,034 B2 | 8/2010 | Yializis et al. | |
| 7,817,182 B2 | 10/2010 | Walker et al. | |
| D638,925 S | 5/2011 | Charlebois et al. | |
| 7,942,387 B2 | 5/2011 | Forkosh | |
| 7,966,841 B2 | 6/2011 | Lowenstein et al. | |
| 8,002,023 B2 | 8/2011 | Murayama | |
| 8,033,532 B2 | 10/2011 | Yabu | |
| 8,137,436 B2 | 3/2012 | Calis et al. | |
| 8,157,891 B2 | 4/2012 | Montie et al. | |
| 8,318,824 B2 | 11/2012 | Matsuoka et al. | |
| 8,550,151 B2 | 10/2013 | Murayama et al. | |
| 8,769,971 B2 | 7/2014 | Kozubal et al. | |
| 8,783,053 B2 | 7/2014 | McCann | |
| 8,887,523 B2 | 11/2014 | Gommed et al. | |
| 8,899,061 B2 | 12/2014 | Reytblat | |
| 8,915,092 B2 | 12/2014 | Gerber et al. | |
| 8,920,699 B2 | 12/2014 | Marutani et al. | |
| 8,943,848 B2 | 2/2015 | Phannavong et al. | |
| 8,966,924 B2 | 3/2015 | Pichai | |
| 9,027,764 B2 | 5/2015 | Marutani et al. | |
| 9,109,808 B2 | 8/2015 | Gerber et al. | |
| 9,188,349 B2 | 11/2015 | Warmerdam et al. | |
| 9,234,665 B2 * | 1/2016 | Erb | F24F 3/1417 |
| 9,243,810 B2 | 1/2016 | Vandermeulen et al. | |
| 9,273,877 B2 | 3/2016 | Vandermeulen | |
| 9,429,332 B2 | 8/2016 | Vandermeulen et al. | |
| 9,810,439 B2 | 11/2017 | Coutu et al. | |
| 9,816,760 B2 * | 11/2017 | LePoudre | F28F 9/026 |
| 10,302,317 B2 | 5/2019 | Besant et al. | |
| 10,352,628 B2 | 7/2019 | Erb et al. | |
| 2001/0003902 A1 | 6/2001 | Kopko | |
| 2002/0005271 A1 | 1/2002 | Weiss et al. | |
| 2002/0038552 A1 | 4/2002 | Maisotsenko et al. | |
| 2003/0014983 A1 | 1/2003 | Maisotsenko et al. | |
| 2003/0037905 A1 | 2/2003 | Weng | |
| 2003/0070787 A1 | 4/2003 | Moffitt | |
| 2003/0121271 A1 | 7/2003 | Dinnage et al. | |
| 2004/0000152 A1 | 1/2004 | Fischer | |
| 2004/0061245 A1 | 4/2004 | Maisotsenko et al. | |
| 2004/0134211 A1 | 7/2004 | Lee et al. | |
| 2004/0134212 A1 | 7/2004 | Lee et al. | |
| 2004/0168462 A1 | 9/2004 | Assaf | |
| 2004/0226685 A1 | 11/2004 | Gagnon et al. | |
| 2005/0056042 A1 | 3/2005 | Bourne et al. | |
| 2005/0072303 A1 | 4/2005 | Weidenmann | |
| 2005/0230080 A1 | 10/2005 | Paul et al. | |
| 2005/0249901 A1 | 11/2005 | Yializis et al. | |
| 2005/0262862 A1 | 12/2005 | Moffitt | |
| 2005/0279115 A1 | 12/2005 | Lee et al. | |
| 2006/0021615 A1 | 2/2006 | Kertzman | |
| 2006/0042295 A1 | 3/2006 | Assaf | |
| 2006/0205301 A1 | 9/2006 | Klare et al. | |
| 2007/0029685 A1 | 2/2007 | Lin | |
| 2007/0056894 A1 | 3/2007 | Connors | |
| 2007/0095519 A1 | 5/2007 | Hombucher | |
| 2007/0234743 A1 | 10/2007 | Assaf | |
| 2007/0279861 A1 | 12/2007 | Doll | |
| 2008/0023182 A1 | 1/2008 | Beamer et al. | |
| 2008/0085437 A1 | 4/2008 | Dean et al. | |
| 2008/0099184 A1 | 5/2008 | Han | |
| 2008/0283217 A1 | 11/2008 | Gagnon et al. | |
| 2009/0095162 A1 | 4/2009 | Hargis et al. | |
| 2009/0126913 A1 | 5/2009 | Lee et al. | |
| 2009/0133866 A1 | 5/2009 | Campbell et al. | |
| 2009/0193974 A1 | 8/2009 | Montie et al. | |
| 2009/0211977 A1 * | 8/2009 | Miller | B01D 63/082 |
| | | | 210/646 |
| 2009/0294110 A1 | 12/2009 | Foust | |
| 2009/0324929 A1 | 12/2009 | Yamakawa et al. | |
| 2010/0090356 A1 | 4/2010 | Sines et al. | |
| 2010/0170655 A1 | 7/2010 | Kronvall et al. | |
| 2010/0170776 A1 | 7/2010 | Ehrenberg et al. | |
| 2010/0181062 A1 | 7/2010 | McCann | |
| 2010/0192605 A1 | 8/2010 | Fang et al. | |
| 2010/0200068 A1 | 8/2010 | D'arcy et al. | |
| 2010/0275629 A1 | 11/2010 | Erickson | |
| 2010/0300123 A1 | 12/2010 | Park et al. | |
| 2010/0319370 A1 | 12/2010 | Kozubal et al. | |
| 2010/0326914 A1 * | 12/2010 | Drost | B01D 63/082 |
| | | | 210/644 |
| 2011/0056384 A1 | 3/2011 | Kadota | |
| 2011/0192579 A1 | 8/2011 | Sotokawa et al. | |
| 2011/0223486 A1 | 9/2011 | Zhang et al. | |
| 2011/0232485 A1 | 9/2011 | Ellsworth | |
| 2011/0232633 A1 | 9/2011 | Lima | |
| 2011/0259572 A1 | 10/2011 | Muratani et al. | |
| 2011/0308265 A1 | 12/2011 | Phannavong et al. | |
| 2012/0061045 A1 | 3/2012 | Huizing | |
| 2012/0073791 A1 | 3/2012 | Dubois | |
| 2012/0085112 A1 | 4/2012 | Wintemute | |
| 2012/0106073 A1 | 5/2012 | Wu et al. | |
| 2012/0125020 A1 | 5/2012 | Vandermeulen et al. | |
| 2012/0125021 A1 | 5/2012 | Vandermeulen et al. | |
| 2012/0125023 A1 | 5/2012 | Kopko et al. | |
| 2012/0125031 A1 | 5/2012 | Vandermeulen et al. | |
| 2012/0125405 A1 | 5/2012 | Vandermeulen et al. | |
| 2012/0125581 A1 | 5/2012 | Allen et al. | |
| 2012/0131934 A1 | 5/2012 | Vandermeulen et al. | |
| 2012/0131937 A1 | 5/2012 | Vandermeulen et al. | |
| 2012/0131938 A1 | 5/2012 | Vandermeulen et al. | |
| 2012/0131939 A1 | 5/2012 | Vandermeulen et al. | |
| 2012/0131940 A1 | 5/2012 | Vandermeulen et al. | |
| 2012/0132513 A1 | 5/2012 | Vandermeulen et al. | |
| 2012/0162918 A1 | 6/2012 | Thyni et al. | |

(56) References Cited

U.S. PATENT DOCUMENTS

| | | |
|---|---|---|
| 2012/0168369 A1 | 7/2012 | Van Medevoort et al. |
| 2012/0180505 A1 | 7/2012 | Gerber et al. |
| 2012/0186281 A1 | 7/2012 | Vandermeulen et al. |
| 2012/0247132 A1 | 10/2012 | Lakdawala et al. |
| 2012/0298340 A1 | 11/2012 | Al-Otaibi |
| 2013/0056177 A1 | 3/2013 | Coutu et al. |
| 2013/0186121 A1 | 7/2013 | Erb et al. |
| 2013/0199220 A1 | 8/2013 | Ma et al. |
| 2013/0240438 A1 | 9/2013 | Willis et al. |
| 2013/0248147 A1 | 9/2013 | Wintemute et al. |
| 2013/0340449 A1 | 12/2013 | Kozubal et al. |
| 2014/0054004 A1 | 2/2014 | LePoudre et al. |
| 2014/0054013 A1 | 2/2014 | Lepoudre et al. |
| 2014/0190037 A1 | 7/2014 | Erb et al. |
| 2014/0245769 A1 | 9/2014 | Vandermeulen et al. |
| 2014/0260367 A1 | 9/2014 | Coutu et al. |
| 2014/0260369 A1 | 9/2014 | Lepoudre et al. |
| 2014/0260399 A1 | 9/2014 | Vandermeulen |
| 2014/0262125 A1 | 9/2014 | Erb et al. |
| 2014/0262144 A1 | 9/2014 | Erb et al. |
| 2014/0326433 A1 | 11/2014 | Kozubal |
| 2015/0096714 A1 | 4/2015 | Dagley et al. |
| 2015/0184876 A1 | 7/2015 | Vandermeulen et al. |
| 2015/0292754 A1 | 10/2015 | Mongar |
| 2015/0323203 A1 | 11/2015 | Gerber et al. |
| 2016/0054012 A1 | 2/2016 | Lepoudre et al. |
| 2016/0084512 A1 | 3/2016 | Erb et al. |
| 2016/0187010 A1 | 6/2016 | Vandermeulen |
| 2016/0290666 A1 | 10/2016 | Coutu et al. |
| 2016/0298865 A1 | 10/2016 | Gerber et al. |
| 2016/0327345 A1 | 11/2016 | Lowenstein |
| 2017/0241655 A1 | 8/2017 | Lepoudre et al. |
| 2019/0212020 A1 | 7/2019 | Besant et al. |
| 2019/0346212 A1 | 11/2019 | Norman Erb et al. |

FOREIGN PATENT DOCUMENTS

| | | | |
|---|---|---|---|
| CA | 2801352 | A1 | 12/2011 |
| CA | 2798928 | A1 | 2/2012 |
| CA | 2843763 | A1 | 3/2013 |
| CA | 2904224 | A1 | 9/2014 |
| CH | 193732 | A | 10/1937 |
| CM | 1343292 | A | 4/2002 |
| CN | 116389 | A | 10/1997 |
| CN | 1456855 | A | 11/2003 |
| CN | 1517610 | A | 8/2004 |
| CN | 1518477 | A | 8/2004 |
| CN | 1666081 | A | 9/2005 |
| CN | 1711448 | A | 12/2005 |
| CN | 200958820 | Y | 10/2007 |
| CN | 101405559 | A | 4/2009 |
| CN | 101421580 | A | 4/2009 |
| CN | 101469090 | A | 7/2009 |
| CN | 101918777 | A | 12/2010 |
| CN | 102076401 | A | 5/2011 |
| CN | 201906567 | U | 7/2011 |
| CN | 102165268 | A | 8/2011 |
| CN | 102232015 | A | 11/2011 |
| CN | 102345909 | A | 2/2012 |
| CN | 102395419 | A | 3/2012 |
| CN | 102548727 | A | 7/2012 |
| CN | 102549361 | A | 7/2012 |
| CN | 102713154 | A | 10/2012 |
| CN | 102933931 | A | 2/2013 |
| CN | 103069246 | A | 4/2013 |
| CN | 103827595 | A | 5/2014 |
| CN | 104583706 | A | 4/2015 |
| CN | 105121989 | A | 12/2015 |
| CN | 105164474 | A | 12/2015 |
| CN | 105164484 | A | 12/2015 |
| CN | 105202795 | A | 12/2015 |
| CN | 105283715 | A | 1/2016 |
| CN | 101512238 | A | 8/2016 |
| CN | 103827595 | B | 4/2017 |
| CN | 105164484 | B | 6/2017 |
| CN | 107249715 | A | 10/2017 |
| CN | 107300230 | A | 10/2017 |
| CN | 108027221 | A | 5/2018 |
| DE | 10143092 | A1 | 3/2003 |
| EP | 0448991 | A2 | 10/1991 |
| EP | 0661502 | A2 | 7/1995 |
| EP | 0678321 | A2 | 10/1995 |
| EP | 1108575 | A1 | 6/2001 |
| EP | 2397787 | A2 | 12/2011 |
| FR | 2291457 | A1 | 6/1976 |
| GB | 1354502 | A | 6/1974 |
| GB | 2015384 | A | 9/1979 |
| IN | 201817002765 | A | 4/2018 |
| JP | 6152594 | A | 3/1986 |
| JP | 05157282 | A | 6/1993 |
| JP | 09196482 | A | 7/1997 |
| JP | 10170177 | A | 6/1998 |
| JP | 2004116419 | A | 4/2004 |
| JP | 2004257588 | A | 9/2004 |
| JP | 2008070046 | A | 3/2008 |
| JP | 2009275955 | A | 11/2009 |
| TW | 1271499 | B | 1/2007 |
| WO | WO-1996041107 | A1 | 12/1996 |
| WO | WO-1999014535 | A1 | 3/1999 |
| WO | WO-0135039 | A1 | 5/2001 |
| WO | WO-0171260 | A1 | 9/2001 |
| WO | WO-03049835 | A1 | 6/2003 |
| WO | WO-2004065875 | A1 | 8/2004 |
| WO | WO-2008037079 | A1 | 4/2008 |
| WO | WO-2008053367 | A2 | 5/2008 |
| WO | WO-2008089484 | A1 | 7/2008 |
| WO | WO-2009000974 | A1 | 12/2008 |
| WO | WO-2009094032 | A1 | 7/2009 |
| WO | WO-2009158030 | A1 | 12/2009 |
| WO | WO-2011062808 | A1 | 5/2011 |
| WO | WO-2011161547 | A2 | 12/2011 |
| WO | WO-2011161547 | A3 | 12/2011 |
| WO | WO-2012018089 | A1 | 2/2012 |
| WO | WO-2012042553 | A1 | 4/2012 |
| WO | WO-2012087273 | A1 | 6/2012 |
| WO | WO-2012097445 | A1 | 7/2012 |
| WO | WO-2012167366 | A1 | 12/2012 |
| WO | WO-2013029148 | A1 | 3/2013 |
| WO | WO-2013094206 | A1 | 6/2013 |
| WO | WO-2013107554 | A1 | 7/2013 |
| WO | WO-2013192397 | A1 | 12/2013 |
| WO | WO-2014029003 | A1 | 2/2014 |
| WO | WO-2014029004 | A1 | 2/2014 |
| WO | WO-2014107790 | A1 | 7/2014 |
| WO | WO-2014138846 | A1 | 9/2014 |
| WO | WO-2014138847 | A1 | 9/2014 |
| WO | WO-2014138859 | A1 | 9/2014 |
| WO | WO-2014138860 | A1 | 9/2014 |
| WO | WO-2016026042 | A1 | 2/2016 |
| WO | WO-2016183667 | A1 | 11/2016 |
| WO | WO-2016183668 | A1 | 11/2016 |
| WO | WO-2016207864 | A1 | 12/2016 |
| WO | WO-2017152268 | A1 | 9/2017 |

OTHER PUBLICATIONS

"International Application Serial No. PCT/IB2016/053799, International Search Report dated Aug. 26, 2016", 4 pgs.

"International Application Serial No. PCT/IB2016/053799, Written Opinion dated Aug. 26, 2016", 6 pgs.

Abdel-Salam, Mohamed R. H., et al., "Experimental Study of Effects of Phase-Change Energy and Operating Parameters on Performances of Two-Fluid and Three-Fluid Liquid-to-Air Membrane Energy Exchangers", ASHRAE Transactions, vol. 122, Part 1, (Jan. 2016), 134-145.

Abdel-Salam, Mohamed R. H., et al., "Performance testing of 2-fluid and 3-fluid liquid-to-air membrane energy exchangers for HVAC applications in cold-dry climates", International Journal of Heat and Mass Transfer, 106, (2017), 12 pgs.

Abdel-Salam, Mohamed R, H., et al., "Performance testing of a novel 3-fluid liquid-to-air membrane energy exchanger (3-fluid LAMEE) under desiccant solution regeneration operating condi-

(56) References Cited

OTHER PUBLICATIONS tions", International Journal of Heat and Mass Transfer, 95, (2015), 14 pgs.
"U.S. Appl. No. 14/190,715, Notice of Allowance dated Mar. 4, 2019", 7 pgs.
"U.S. Appl. No. 14/192,019, Non Final Office Action dated Jun. 25, 2019", 13 pgs.
"U.S. Appl. No. 14/192,019, Response filed Jun. 10, 2019 to Final Office Action dated Jan. 20, 2019", 10 pgs.
"U.S. Appl. No. 14/830,492, Response filed Jun. 29, 2019 to Final Office Action dated Dec. 28, 2018", 6 pgs.
"U.S. Appl. No. 14/957,795, Corrected Notice of Allowability dated Feb. 1, 2019", 4 pgs.
"U.S. Appl. No. 15/185,180, Response filed May 1, 2019 to Non Final Office Action dated Jan. 8, 2019", 11 pgs.
"U.S. Appl. No. 15/590,685, Final Office Action dated Jun. 26, 2019", 14 pgs.
"U.S. Appl. No. 15/590,685, Response filed Apr. 18, 2019 to NonFinal Office Action dated Jan. 11, 2019", 11 pgs.
"Chinese Application Serial No. 201680048895.3, Office Action dated Apr. 17, 2019", w/English Translation, 33 pgs.
"European Application Serial No. 16813836.0, Extended European Search Report dated Mar. 25, 2019", 9 pgs.
"Singapore Application Serial No. 11201710777Y, Office Action dated Jan. 31, 2019", in English, 7 pgs.
"Singapore Application Serial No. 11201710777Y, Response filed Jul. 1, 2019 to Office Action dated Jan. 31, 2019", in English, 31 pgs.
"International Application Serial No. PCT/CA2012/000055, International Preliminary Report on Patentability dated Aug. 1, 2013", 9 pgs.
"International Application Serial No. PCT/CA2012/000055, International Search Report dated May 24, 2012", 4 pgs.
"International Application Serial No. PCT/CA2012/000055, Invitation to Pay Add'l Fees and Partial Search Report dated Mar. 23, 2012", 2 pgs.
"International Application Serial No. PCT/CA2012/000055, Written Opinion dated May 24, 2012", 7 pgs.
"International Application Serial No. PCT/CA2012/00055, International Preliminary Report on Patentability dated Aug. 1, 2013", 9 pgs.
"International Application Serial No. PCT/CA2012/000749, International Search Report dated Oct. 26, 2012", 3 pgs.
"International Application Serial No. PCT/CA2012/000749, Written Opinion dated Oct. 26, 2012", 5 pgs.
"International Application Serial No. PCT/CA2013/000608, International Preliminary Report on Patentability dated Mar. 5, 2015", 7 pgs.
"International Application Serial No. PCT/CA2013/000608, International Search Report dated Sep. 23, 2013", 3 pgs.
"International Application Serial No. PCT/CA2013/000608, Written Opinion dated Sep. 23, 2013", 5 pgs.
"International Application Serial No. PCT/CA2013/000609, International Preliminary Report on Patentability dated Mar. 5, 2015", 7 pgs.
"International Application Serial No. PCT/CA2013/000609, International Search Report dated Sep. 17, 2013", 3 pgs.
"International Application Serial No. PCT/CA2013/000609, Written Opinion dated Sep. 17, 2013", 5 pgs.
"International Application Serial No. PCT/CA2013/000964, International Search Report dated Feb. 7, 2014", 3 pgs.
"International Application Serial No. PCT/CA2013/000964, Written Opinion dated Feb. 7, 2014", 6 pgs.
"International Application Serial No. PCT/CA2014/000048, International Preliminary Report on Patentability dated Sep. 24, 2015", 8 pgs.
"International Application Serial No. PCT/CA2014/000048, International Search Report dated Apr. 29, 2014", 3 pgs.
"International Application Serial No. PCT/CA2014/000048, Written Opinion dated Sep. 29, 2014", 6 pgs.
"International Application Serial No. PCT/CA2014/000083, International Preliminary Report on Patentability dated Sep. 24, 2015", 9 pgs.
"International Application Serial No. PCT/CA2014/000083, International Search Report dated May 14, 2014", 3 pgs.
"International Application Serial No. PCT/CA2014/000083, Written Opinion dated May 14, 2014", 7 pgs.
"International Application Serial No. PCT/CA2014/000148, International Preliminary Report on Patentability dated Sep. 24, 2015", 5 pgs.
"International Application Serial No. PCT/CA2014/000148, International Search Report dated May 9, 2014", 4 pgs.
"International Application Serial No. PCT/CA2014/000148, Written Opinion dated May 9, 2014", 3 pgs.
"International Application Serial No. PCT/CA2014/000169, International Preliminary Report on Patentability dated Sep. 24, 2015", 8 pgs.
"International Application Serial No. PCT/CA2014/000169, International Search Report dated May 27, 2014", 3 pgs.
"International Application Serial No. PCT/CA2014/000169, Written Opinion dated May 27, 2014", 6 pgs.
"International Application Serial No. PCT/CA2014/000171, International Preliminary Report on Patentability dated Sep. 24, 2015", 7 pgs.
"International Application Serial No. PCT/CA2014/000171, International Search Report dated May 27, 2014", 3 pgs.
"International Application Serial No. PCT/CA2014/000171, Written Opinion dated May 27, 2014", 5 pgs.
"International Application Serial No. PCT/CA2015/050787, International Search Report dated Nov. 4, 2015", 3 pgs.
"International Application Serial No. PCT/CA2015/050787, Written Opinion dated Nov. 4, 2015", 3 pgs.
"International Application Serial No. PCT/CA2016/050252, International Preliminary Report on Patentability dated Nov. 30, 2017", 6 pgs.
"International Application Serial No. PCT/CA2016/050252, International Search Report dated May 26, 2016", 3 pgs.
"International Application Serial No. PCT/CA2016/050252, Written Opinion dated May 26, 2016", 4 pgs.
"International Application Serial No. PCT/CA2016/050507, International Preliminary Report on Patentability dated Nov. 30, 2017", 5 pgs.
"International Application Serial No. PCT/CA2016/050507, International Search Report dated Jul. 21, 2016", 3 pgs.
"International Application Serial No. PCT/CA2016/050507, Written Opinion dated Jul. 21, 2016", 3 pgs.
"International Application Serial No. PCT/CA2017/050180, International Search Report dated Apr. 26, 2017", 3 pgs.
"International Application Serial No. PCT/CA2017/050180, Written Opinion dated Apr. 26, 2017", pgs.
"International Application Serial No. PCT/IB2011/002145, International Preliminary Report on Patentability dated Jan. 10, 2013", 13 pgs.
"International Application Serial No. PCT/IB2011/002145, International Search Report dated Feb. 15, 2012", 7 pgs.
"International Application Serial No. PCT/IB2011/002145, Written Opinion dated Feb. 15, 2012", 11 pgs.
"International Application Serial No. PCT/US00/02956, International Preliminary Report on Patentability dated Jul. 9, 2001", 3 pgs.
"International Application Serial No. PCT/US00/02956, International Search Report dated Nov. 8, 2000", 1 pg.
Abdel-Salam, Mohamed R.H., et al., "Design and testing of a novel 3-fluid liquid-to-air membrane energy exchanger (3-fluid LAMEE)", International Journal of Heat and Mass Transfer 92, (2016), 312-329.
U.S. Appl. No. 14/830,492, filed Aug. 19, 2015, Liquid to Air Membrane Energy Exchangers.
U.S. Pat. No. 9,810,439, filed Apr. 18, 2019, Energy Exchange System for Conditioning Air in an Enclosed Structure.
U.S. Appl. No. 15/185,180, filed Jun. 17, 2016, Energy Exchange System for Conditioning Air in an Enclosed Structure.
U.S. Pat. No. 10,302,317, dated Dec. 3, 2015, Liquid-to-Air Membrane Energy Exchanger.

(56) References Cited

OTHER PUBLICATIONS

U.S. Appl. No. 16/351,046, filed Mar. 12, 2019, Liquid-to-Air Membrane Energy Exchanger.
U.S. Pat. No. 9,816,760, dated Mar. 12, 2013, Liquid Panel Assembly.
U.S. Appl. No. 15/590,685, filed May 9, 2017, Liquid Panel Assembly.
U.S. Appl. No. 14/192,019, filed Feb. 27, 2014, Energy Exchange Assembly with Microporous Membrane.
U.S. Appl. No. 14/187,413, filed Feb. 24, 2014, Evaporative Cooling System with Liquid-to-Air Membrane Energy Exchanger.
U.S. Pat. No. 10,352,628, dated Feb. 26, 2014, Membrane-Integrated Energy Exchange Assembly.
U.S. Appl. No. 16/431,397, filed Jun. 4, 2019, Membrane-Integrated Energy Exchange Assembly.
U.S. Appl. No. 14/171,951, filed Feb. 4, 2014, Control System and Method for a Liquid Desiccant Air Delivery System.
"European Application Serial No. 16813836.0, Partial Supplementary European Search Report dated Dec. 5, 2018", 11 pgs.
"European Application Serial No. 16813836.0, Response to Extended European Search Report dated Mar. 25, 2019", 11 pgs.
Larson, Michael D., et al., "The elastic and moisture transfer properties of polyethylene and polypropylene membranes for use in liquid-to-air energy exchangers", Journal of Membrane Science 302, (2007), 14 pgs.
"U.S. Appl. No. 15/590,685, Non Final Office Action dated Jan. 7, 2020", 15 pgs.
"U.S. Appl. No. 15/590,685, Response filed Dec. 19, 2019 to Final Office Action dated Jun. 26, 2019", 11 pgs.
"U.S. Appl. No. 16/784,822, Supplemental Preliminary Amendment filed Feb. 14, 2020".
"Chinese Application Serial No. 201680048895.3, Response filed Nov. 4, 2019 to Office Action dated Apr. 17, 2019", w/ English claims, 29 pgs.
"Indian Application Serial No. 201817002765, First Examination Report dated Dec. 24, 2019", w/ English Translation, 6 pgs.
Abdel-Salam, Mohamed R.H., et al., "Performance Testing of a Novel 3-Fluid Liquid-to-Air Membrane Energy Exchanger (3-Fiuid LAMEE) for HVAC Applications", 28th Intl. Conference on Efficiency, Cost, Optimization, Simulation and Environmental Impact of Energy Systems (ECOS), Pau, France, (Jun. 30, 2015), 12 pgs.
"Chinese Application Serial No. 201680048895.3, Office Action dated Apr. 15, 2020", w/ English Translation, 12 pgs.
"European Application Serial No. 16813836.0, Communication Pursuant to Article 94(3) EPC dated Mar. 24, 2020", 5 pgs.

\* cited by examiner

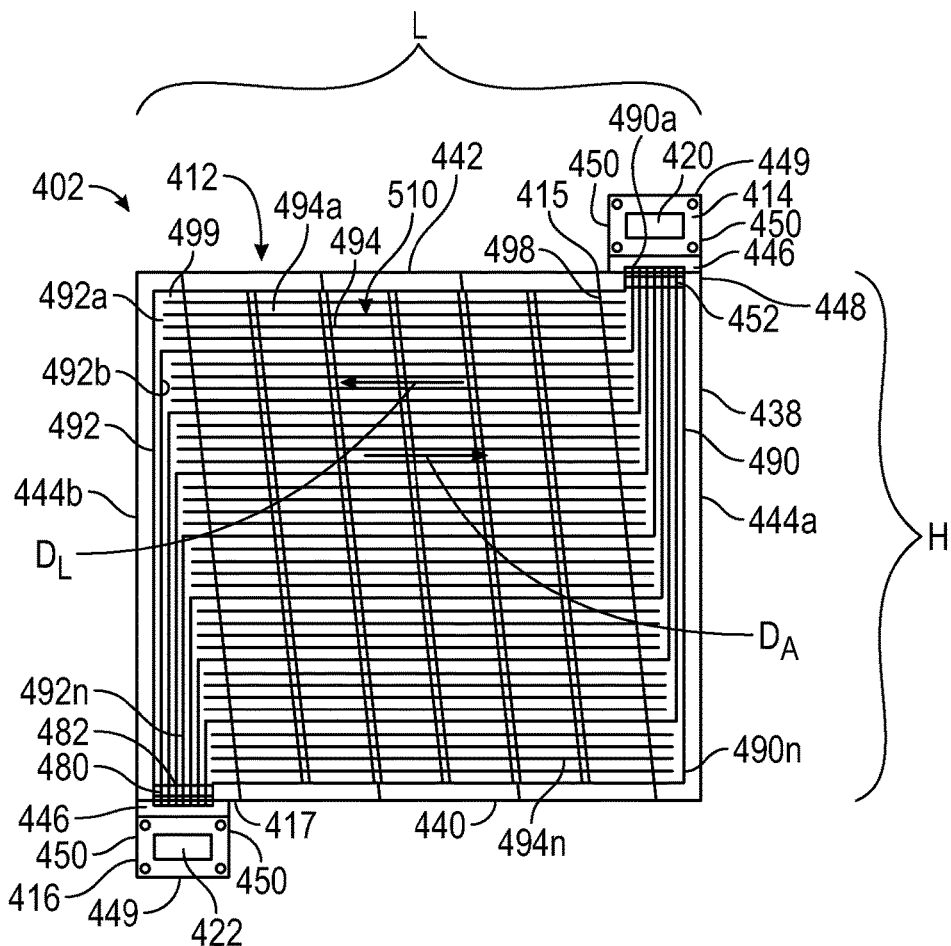
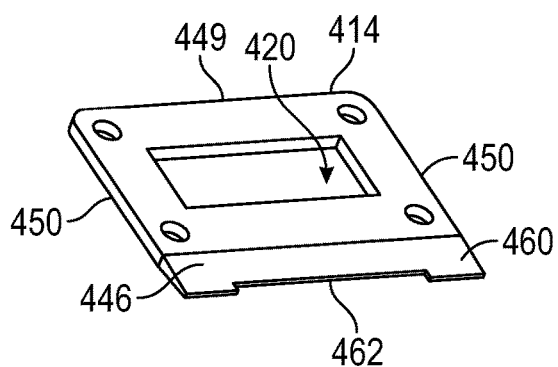
FIG. 6
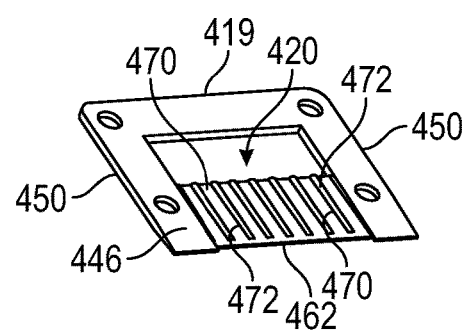
FIG. 7

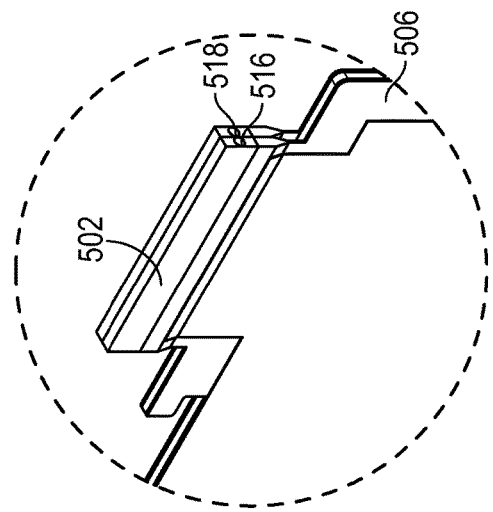
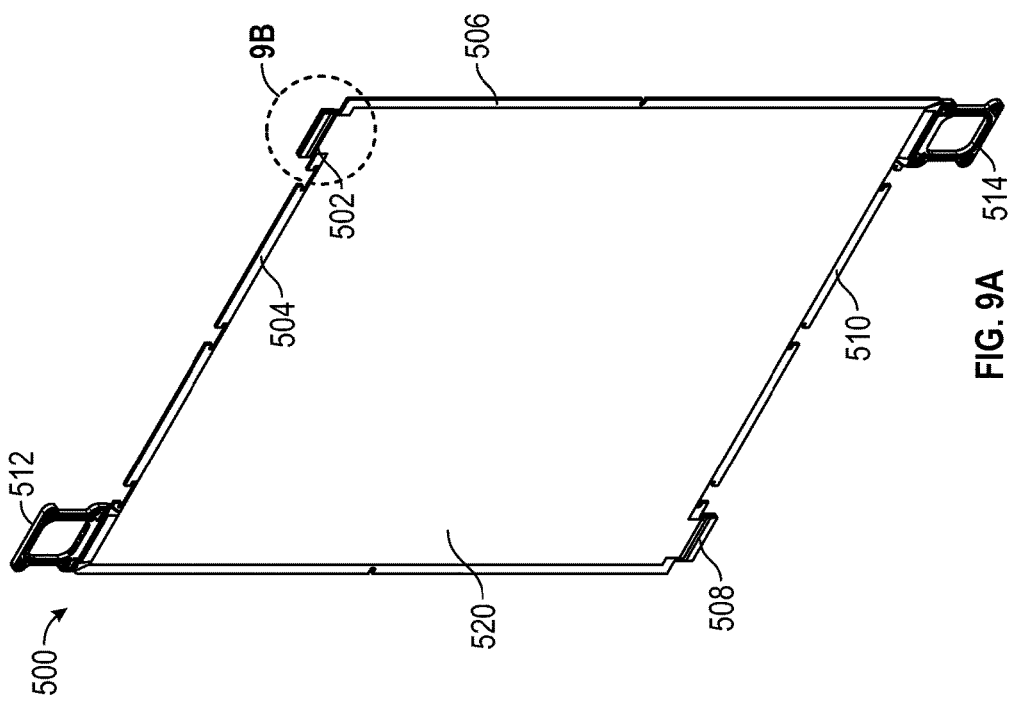

THREE-FLUID LIQUID TO AIR MEMBRANE ENERGY EXCHANGER

CLAIM OF PRIORITY

This application is a U.S. National Stage Filing under 35 U.S.C. § 371 of International Patent Application No. PCT/IB2016/053799, filed on Jun. 24, 2016, and published on Dec. 29, 2016, as WO 2016/207864 A1, which claims the benefit of U.S. Provisional Patent Application Ser. No. 62/185,439, filed on Jun. 26, 2015, the benefit of priority of each of which are claimed hereby, and each of which are incorporated by reference herein in their entirety.

BACKGROUND

Enclosed structures, such as occupied buildings, factories and the like, generally include a heating/ventilation/air conditioning (HVAC) system for conditioning ventilation and/or recirculated air. The HVAC system includes a supply air flow path and an exhaust air flow path. The supply air flow path receives pre-conditioned air, for example outside air or outside air mixed with re-circulated air, and channels and distributes the air into the enclosed structure. The pre-conditioned air is conditioned by the HVAC system to provide a desired temperature and humidity of supply air discharged into the enclosed structure.

A liquid to air membrane energy exchanger (LAMEE) transfers heat and moisture between a liquid desiccant and an air stream in order to condition the temperature and humidity of the air flowing through the LAMEE. LAMEEs can be employed in a number of different applications, including, for example, Heating Ventilation and Air Conditioning (HVAC) systems, dehumidification systems, evaporative cooling, industrial applications requiring treated air, etc. In another application, the exchanger transfers heat and moisture between the desiccant and air in order to condition the temperature and concentration of the desiccant by both releasing or gaining heat and releasing or gaining moisture in the desiccant in any combination.

Existing LAMEEs have a desiccant flow channel bounded by vapor-permeable membranes. The membranes prevent leakage of desiccant into the air stream (liquid cannot penetrate through the membrane), while allowing the transfer of heat and moisture vapor between the air and desiccant in order to condition the air. For example, the desiccant may absorb moisture and heat from the air in order to cool and dehumidify the air. The heat of condensation of water vapor, from the air, into the desiccant (in addition to any collected sensible heat) causes the temperature of the liquid desiccant to increase. As the liquid desiccant temperature increases, its water vapor pressure increases, which reduces its ability to absorb moisture from the air. Therefore, in existing LAMEEs, the mass flow of liquid desiccant can often be kept high enough to transport the required amount of energy (collected sensible and latent heat from the air) without producing a significant temperature increase in the desiccant flow. Electrical energy is consumed to pump the desiccant through the exchanger.

Overview

The present inventors recognize, among other things, an opportunity for improved performance in a liquid to air membrane energy exchanger (LAMEE) through use of a third fluid (a second cooling fluid) which can provide additional cooling through contact with the liquid desiccant (a first cooling fluid) flowing through the exchanger. The present application discloses designs of the liquid flow panel, for use in the LAMEE, to facilitate the second cooling fluid and maintain effective operating conditions of the LAMEE.

Examples according to the present application include a liquid panel assembly having a support frame comprising a first fluid circuit configured to receive a first cooling fluid to condition an air stream and a second fluid circuit configured to receive a second cooling fluid to transfer heat to or from the first cooling fluid. The second fluid circuit can be separate from the first fluid circuit. The panel assembly can have a first semi-permeable layer secured to a first side of the support frame and a second semi-permeable layer secured to a second side of the support frame opposite the first side. In the design of the liquid panel assembly, the first fluid circuit is configured to at least partially offset hydrostatic pressure gain with friction pressure loss of the first cooling fluid to reduce pressure within the liquid panel assembly. In an example, an operating pressure of the first cooling fluid in the liquid panel assembly can be at or below about 0.5 psi. The liquid panel assembly can be used in a LAMEE for conditioning an air stream.

Examples according to the present application include an energy exchange system comprising a plurality of air channels configured to allow air to pass therethrough and a plurality of liquid panel assemblies alternately spaced with the plurality of air channels. Each of the plurality of liquid panel assemblies can include a support frame comprising a first fluid circuit configured to circulate a first cooling fluid through the liquid panel assembly and a second fluid circuit configured to circulate a second cooling fluid through the liquid panel assembly, the first fluid circuit separate from the second fluid circuit. Each of the plurality of liquid panel assemblies can include one or more sealing members secured to the support frame, an interior surface of the one or more sealing members in contact with the first cooling fluid or the second cooling fluid, and an exterior surface of the one or more sealing members in contact with an adjacent air channel of the plurality of air channels. The first fluid circuit is configured to at least partially offset hydrostatic pressure gain with friction pressure loss of the first cooling fluid to reduce pressure within the liquid panel assembly.

Examples according to the present application include a liquid panel assembly configured to circulate a first cooling fluid and a second cooling fluid separately through the liquid panel assembly. The liquid panel assembly can comprise a panel frame, a first film attached to a first side of the panel frame, a second film attached to a second side of the panel frame opposite the first side, the second film spaced apart from the first film to create a first channel for circulating the second cooling fluid through the panel frame, and at least one semi-permeable membrane secured to the panel frame and configured to allow vapor to pass through the at least one semi-permeable membrane. The first film is positioned between the at least one semi-permeable membrane and the second film, and the first film is spaced apart from the at least one semi-permeable membrane to create a second channel for circulating the first cooling fluid through the panel frame. The first cooling fluid is configured to condition an air stream and the second cooling fluid is configured to condition the first cooling fluid. The first and second films can be spaced apart by a support structure having a plurality of intersecting horizontal and vertical members. In an example, each of the first and second films can have a thickness ranging between about 0.025 mm and about 1 mm. In an example, each of a first fluid circuit of the first cooling fluid and a second fluid circuit of the second cooling fluid are configured to at least partially offset hydrostatic pressure gain with friction pressure loss of each of the first and second cooling fluids to reduce pressure within the liquid panel assembly. In an example, an operating pressure of the first and second cooling fluids through the panel assembly can be at or below about 0.5 psi.

Examples according to the present application include a method of forming a liquid panel assembly configured to circulate a first cooling fluid and a second cooling fluid through the liquid panel assembly. The method can comprise providing a panel frame having a support structure and a perimeter formed around the support structure, attaching a first film to a first side of the panel frame, attaching a second film to a second side of the panel frame opposite the first side, and attaching a membrane to the first film. The support structure can be disposed between the first film and the second film. An internal coolant circuit can be formed between the first and second films and configured for circulating the second cooling fluid through the liquid panel assembly. A desiccant cooling circuit can be formed between the first film and the membrane and configured for circulating the first cooling fluid through the liquid panel assembly. The first and second films can be formed of one or more polymers, and a thickness of each of the first and second films can be between about 0.025 mm and about 1.0 mm.

Examples according to the present application include a liquid panel assembly comprising a support frame comprising a first fluid circuit configured to receive a first cooling fluid configured for conditioning an air stream, and a plurality of tubes. Each of the plurality of tubes can be oriented generally in a vertical direction on the support frame and configured to circulate a second cooling fluid through a passage of the tube. A portion of each tube is located within the first fluid circuit and the first cooling fluid flows around each tube. The second cooling fluid is configured to absorb or reject heat from the first cooling fluid. The liquid panel assembly comprises at least one membrane secured to the support frame. The first cooling fluid is configured to contact an interior surface of the at least one membrane when the first cooling fluid is circulated from the inlet channel to the outlet channel. Horizontal members of the support frame can be molded to and around the plurality of tubes. The tubes can be formed of metal. The second cooling fluid can be a high pressure refrigerant.

Examples according to the present application include a method of operating an energy exchange system and can comprise providing a plurality of liquid panel assemblies, spacing each of the liquid panel assemblies from one another to create a plurality of air channels, flowing a first cooling fluid through a first fluid circuit in each of the plurality of liquid panel assemblies, flowing a second cooling fluid through a plurality of tubes arranged vertically within each of the plurality of liquid panel assemblies, and directing an air stream through the plurality of air channels. The plurality of tubes are located within at least a portion of the first fluid circuit. The air stream contacts at least one exterior surface of each of the plurality of liquid panel assemblies. The method can further comprise conditioning the air stream using the first cooling fluid and conditioning the first cooling fluid using the second cooling fluid.

Examples according to the present application include a method of forming a liquid panel assembly configured to circulate a first cooling fluid and a second cooling fluid through the liquid panel assembly, and can comprise providing a plurality of tubes, each tube having a hollow interior from a top to a bottom of the tube, and arranging the plurality of tubes such that the tubes are parallel to and spaced apart from one another. The method can further comprise forming a support structure around the plurality of tubes, the support structure integral with or attached to a panel frame, each of the plurality of tubes arranged generally vertically on the panel frame. In an example, the support structure can be formed around the plurality of tubes through injection molding. The method can further comprise forming a first fluid circuit for the first cooling fluid with the panel frame and the support structure, forming a second fluid circuit for the second cooling fluid, the second fluid circuit including passage of the second cooling fluid through the plurality of tubes, and attaching at least one membrane to the panel frame. The first cooling fluid is configured to contact an interior surface of the at least one membrane when the first cooling fluid is circulating through the first fluid circuit.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5 is a front view of a support frame of a liquid panel assembly in accordance with the present patent application.

FIG. 6 is an isometric top view of an inlet member in accordance with the present patent application.

FIG. 7 is an internal view of an inlet member in accordance with the present application.

FIGS. 9A and 9B are perspective views of a liquid panel assembly in accordance with the present patent application.

FIGS. 14A-14C are perspective views of the liquid panel assembly of FIG. 13 in accordance with the present patent application.

DETAILED DESCRIPTION

Figure 1:
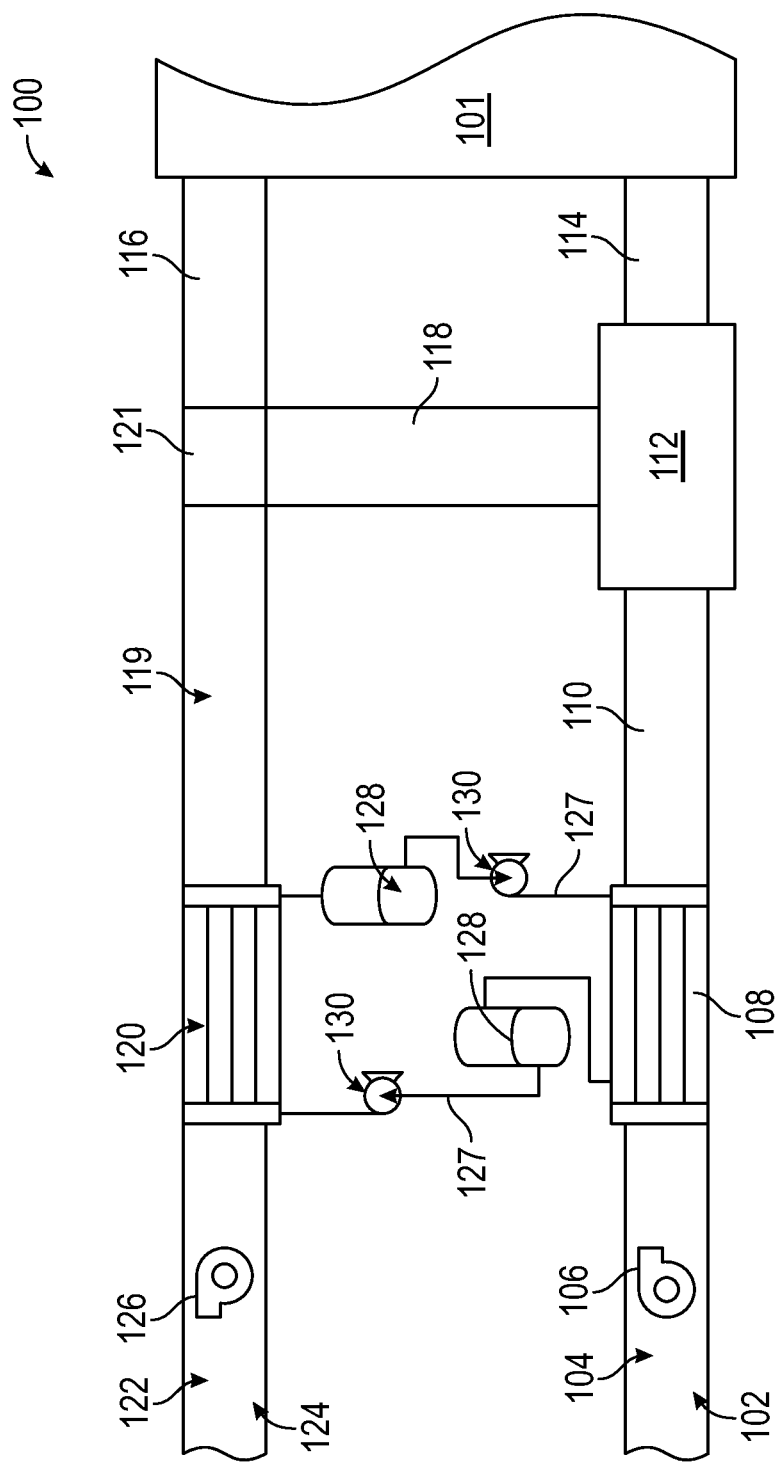
FIG. 1 is a schematic of an example energy exchange system in accordance with the present patent application.

A liquid to air membrane energy exchanger (LAMEE) can be used as part of a heating and cooling system (or energy exchange system) to transfer heat and moisture between a liquid desiccant and an air stream to condition the temperature and humidity of the air flowing through the LAMEE.

In an example, the following dimensionless ratio can be used to characterize the sensible and latent transfer effectiveness of a LAMEE:

$$C_r^* = \frac{(\dot{m}c_p)_{desiccant}}{(\dot{m}c_p)_{air}}$$

In the equation above, $mc_p$ is the product of the mass flow rate and the specific heat. In the numerator, $mc_p$ of the desiccant is used; in the denominator, $mc_p$ of the air is used. During operation of the LAMEE, it may be desirable to maintain the ratio at or above 3 in order to achieve good transfer effectiveness in the exchanger. In some cases, the effectiveness of the exchanger can degrade significantly at ratios less than 3. In effect, this can mean that the mass flow rate of desiccant should be about the same as, or greater than, the mass flow rate of the air since the ratio of the desiccant's specific heat to the air's specific heat is about 3.

As more electrical energy is needed to circulate more desiccant, the electrical energy loss is balanced against the performance improvement of the exchanger, and optimizing the overall system efficiency (such as, for example, COP). It may be advantageous if the mass flow and pumping power of the liquid in the exchanger could be reduced without compromising the performance of the exchanger. This could be accomplished if another liquid with a higher specific heat (such as, for example, water) or a material experiencing a phase change (such as, for example, a refrigerant) is used to transport the thermal energy out of the exchanger. In this case, the total pumping power of the exchanger could be lowered. In addition, the total volume of liquid desiccant in the system could be substantially reduced if it is not required to transport thermal energy, but rather to only transport moisture.

Some desiccants, such as, for example, lithium chloride (LiCl), are expensive and reducing the required salt charge can lead to cost savings. If the liquid desiccant is used to transport the thermal energy, the liquid desiccant may need to be cooled in a separate exchanger. Since halide salt desiccants are corrosive to most metals, the selection of these exchangers may be difficult due to the need to use specialized materials (such as, for example, titanium). This could lead to further cost increases, and other restrictions on the design, including unavailability of exchangers in the required capacities or for the desired refrigerants.

The present application discloses systems and methods for conditioning air (a first overall fluid) using a LAMEE having a liquid panel assembly with a first fluid circuit for a first cooling fluid (a second overall fluid) and a second fluid circuit for a second cooling fluid (a third overall fluid). The first cooling fluid, also referred to herein as a desiccant, can be configured to circulate through the liquid panel assembly and condition an air stream passing through the LAMEE. The second cooling fluid, also referred to herein as a coolant, can be configured to also circulate through the panel assembly and reject heat from the first cooling fluid. The first and second cooling fluids can be separate from each other during circulation through the panel assembly. The use of the second fluid circuit in the liquid panel assembly can increase a cooling capacity of the liquid panel assembly and an overall efficiency of the LAMEE.

The present application discloses various designs of the panel assembly to accommodate the second fluid circuit for the second cooling fluid for use in the LAMEE. In these designs of the liquid panel, the second cooling fluid can be used to provide additional cooling of the air stream, and the first fluid circuit can be configured to circulate the first cooling fluid at low pressures to reduce pressure within the panel assembly. Low operating pressures of the first fluid circuit can be facilitated by the design of the liquid panel to at least partially offset hydrostatic pressure gain with friction pressure loss of the first cooling fluid.

Reference is made to application Ser. No. 13/797,152, entitled LIQUID PANEL ASSEMBLY and published as US Publication No. 2014/0054013, which is incorporated by reference herein in its entirety and provides additional details on a liquid panel assembly usable in the present application. The liquid panels described herein are configured for use with a LAMEE. Reference is made to application Ser. No. 13/702,596, entitled LIQUID-TO-AIR MEMBRANE ENERGY EXCHANGER, and published as US Publication No. 2013/0186121, which discloses an energy exchanger suitable for use with the liquid panels described herein.

FIG. 1 illustrates a schematic view of an example of an energy exchange system 100. The system 100 is configured to partly or fully condition air supplied to a structure 101. The system 100 may include an inlet 102 for a pre-conditioned air flow path 104. The pre-conditioned air flow path 104 may include outside air, air from a building adjacent to the enclosed structure 101, or air from a room within the enclosed structure 101. Airflow in the pre-conditioned air flow path 104 may be moved through the pre-conditioned air flow path 104 by a fan 106. The fan 106 directs the pre-conditioned air flow through path 104 to a supply air liquid-to-air membrane energy exchanger (LAMEE) 108. The supply air LAMEE 108 conditions the pre-conditioned air flow in path 104 to generate a change in air temperature and humidity (i.e. to pre-conditioned the air partly or fully) toward that which is required for a supply air flow condition to be discharged into the enclosed space 101. During a winter mode operation, the supply air LAMEE 108 may condition the pre-conditioned air flow path 104 by adding heat and moisture to the pre-conditioned air in flow path 104. In a summer mode operation, the supply air LAMEE 108 may condition the pre-conditioned air flow path 104 by removing heat and moisture from the pre-conditioned air in flow path 104. The pre-conditioned air 110 may be channeled to an HVAC system 112 of the enclosed structure 101. The HVAC system 112 may further condition the pre-conditioned air 110 to generate the desired temperature and humidity for the supply air 114 that is supplied to the enclosed structure 101.

As shown in FIG. 1, one fan 106 may be located upstream of the LAMEE 108. Optionally, the pre-conditioned air flow path 104 may be moved by a down-stream fan and/or by multiple fans or a fan array or before and after each LAMEE in the system.

Return air 116 is channeled out of the enclosed structure 101. A mass flow rate portion 118 of the return air 116 may be returned to the HVAC system 112. Another mass flow rate portion 119 of the return air 116 may be channeled to a return air or regeneration LAMEE 120. The portions 118 and 119 may be separated with a damper 121 or the like. For example, 80% of the return air 116 may be channeled to the HVAC system 112 and 20% of the return air 116 may be channeled to the return air LAMEE 120. The return air LAMEE 120 exchanges energy between the portion 119 of the return air 116 and the preconditioned air 110 in the supply air LAMEE 108. During a winter mode, the return air LAMEE 120 collects heat and moisture from the portion 119 of the return air 116. During a summer mode, the return air LAMEE 120 discharges heat and moisture into the portion 119 of the return air 116. The return air LAMEE 120 generates exhaust air 122. The exhaust air 122 is discharged from the structure 101 through an outlet 124. A fan 126 may be provided to move the exhaust air 122 from the return air LAMEE 120. The system 100 may include multiple fans 126 or one or more fan arrays located either up-stream or down-stream (as in FIG. 1) of the return air LAMEE 120.

A liquid, such as a desiccant fluid 127, flows between the supply air LAMEE 108 and the return air LAMEE 120. The desiccant fluid 127 transfers the heat and moisture between the supply air LAMEE 108 and the return air LAMEE 120. The system 100 may include desiccant storage tanks 128 in fluid communication between the supply air LAMEE 108 and the return air LAMEE 120. The storage tanks 128 store the desiccant fluid 127 as it is channeled between the supply air LAMEE 108 and the return air LAMEE 120. Optionally, the system 100 may not include both storage tanks 128 or may have more than two storage tanks. Pumps 130 are provided to move the desiccant fluid 127 from the storage tanks 128 to one of the supply air LAMEE 108 or the return air LAMEE 120. The illustrated example includes two pumps 130. Optionally, the system 100 may be configured with as few as one pump 130 or more than two pumps 130. The desiccant fluid 127 flows between the supply air LAMEE 108 and the return air LAMEE 120 to transfer heat and moisture between the conditioned air 110 and the portion 118 of the return air 116.

The energy exchange system 100 of FIG. 1 is an example of the type of system that a LAMEE can be used within. It is recognized that the LAMEEs described herein can be used in other types of systems and designs configured for conditioning air for an enclosed space. In the example of FIG. 1, the LAMEEs 108 and 120 can operate in a passive manner such that the liquid desiccant is not conditioned or controlled. In other words, the system 100 may not include means to heat or cool the liquid desiccant or change a concentration of the liquid desiccant. In other examples, one or more LAMEEs, which are similar in design to the LAMEEs described herein, can be part of the HVAC system and the LAMEEs can be actively controlled. The liquid desiccant in the LAMEE can be heated or cooled depending on, for example, set point conditions of the HVAC system. Similarly, a concentration of the liquid desiccant can be increased or decreased by adding water or concentrated desiccant.

Figure 2:
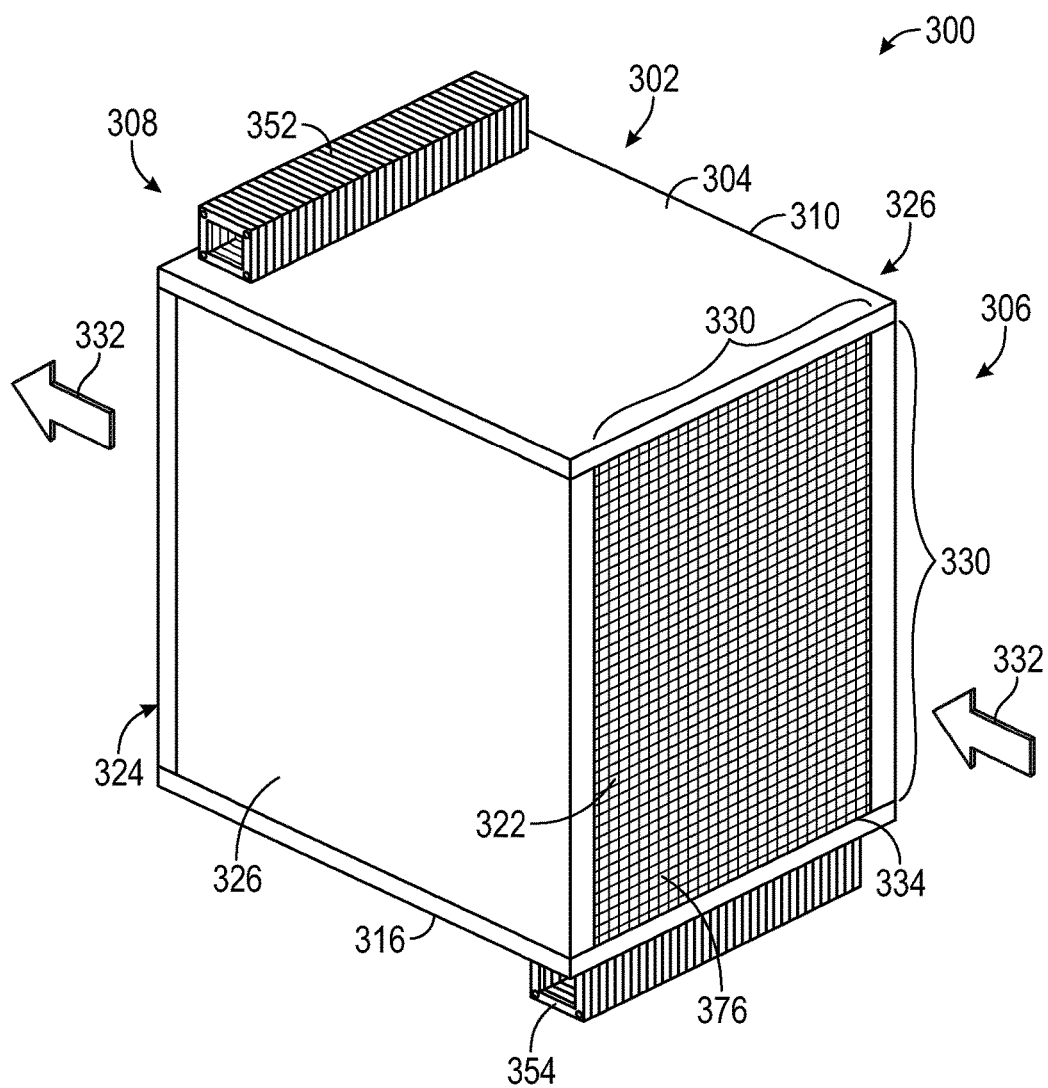
FIG. 2 is a side perspective view of an example liquid-to-air membrane energy exchanger in accordance with the present patent application.

FIG. 2 illustrates a side perspective view of an example of a LAMEE 300. The LAMEE 300 may be used as the supply air LAMEE 108 and/or the return or exhaust air LAMEE 120 (shown in FIG. 1). The LAMEE 300 includes a housing 302 having a body 304. The body 304 includes an air inlet end 306 and an air outlet end 308. A top 310 extends between the air inlet end 306 and the air outlet end 308. While not shown, a stepped-down top may be positioned at the air inlet end 306. The stepped-down top may be stepped a distance from the top 310. A bottom 316 extends between the air inlet end 306 and the air outlet end 308. While not shown, a stepped-up bottom may be positioned at the air outlet end 308. The stepped-up bottom may be stepped a distance from the bottom 316. In alternative designs the stepped-up bottom or stepped-down top sections may have different sizes of steps or no step at all. An air inlet 322 is positioned at the air inlet end 306. An air outlet 324 is positioned at the air outlet end 308. Sides 326 extend between the air inlet 322 and the air outlet 324.

An energy exchange cavity 330 extends through the housing 302 of the LAMEE 300. The energy exchange cavity 330 extends from the air inlet end 306 to the air outlet end 308. An air stream 332 is received in the air inlet 322 and flows through the energy exchange cavity 330. The air stream 332 is discharged from the energy exchange cavity 330 at the air outlet 324. The energy exchange cavity 330 may include a plurality of panels 334, such as liquid panels configured to receive desiccant and direct the flow of the desiccant therethrough.

A desiccant inlet reservoir 352 may be positioned on the top 310. The desiccant inlet reservoir 352 may be configured to receive desiccant, which may be stored in a storage tank 128 (shown in FIG. 1). The desiccant inlet reservoir 352 may include an inlet in flow communication with the storage tank 128. The desiccant is received through the inlet. The desiccant inlet reservoir 352 may also include an outlet that is in fluid communication with desiccant channels 376 of the panels 334 in the energy exchange cavity 330. The liquid desiccant flows through the outlet into the desiccant channels 376. The desiccant flows along the panels 334 through the desiccant channels 376 to a desiccant outlet reservoir 354, which may be positioned at or proximate the bottom 316. Accordingly, the desiccant may flow through the LAMEE 300 from top to bottom. For example, the desiccant may flow into the desiccant channels 376 proximate the desiccant inlet reservoir 352, through the desiccant channels 376, and out of the LAMEE 300 proximate to the desiccant outlet reservoir 354. In another example, the desiccant may flow through the LAMEE 300 from bottom to top.

Air from an enclosed space like a commercial or residential building enters the LAMEE 300 through the air inlet end 306. The air 332 entering the LAMEE 300 has a first temperature and a first humidity. The air 332 flows through one or more air flow channels in the LAMEE 300, which are separated from the liquid desiccant flowing through the LAMEE 300 by selectively permeable membrane(s). As the inlet air 332 flows through the LAMEE 300, the liquid desiccant acts to condition the air by altering the temperature and humidity of the air. For example, the liquid desiccant can have a lower temperature than the inlet air and can act to remove heat from the inlet air such that the conditioned air exiting the LAMEE 300 is at a lower temperature compared to the air entering the LAMEE 300.

Additionally, the hygroscopic property of the desiccant can allow the desiccant to either release or absorb water vapor from the inlet air depending, for example, on the water vapor pressure of the desiccant compared to that of the inlet air. For example, liquid desiccants with relatively low vapor pressures can provide a large potential for dehumidification of the inlet air flowing through the LAMEE 300. The conditioned air flowing out of the LAMEE 300 after being conditioned by the liquid desiccant separated from the air by the selectively permeable membrane has a second temperature and second humidity, which is different than the first temperature and first humidity of the inlet air.

Although not shown in FIG. 2, the LAMEE 300 can also include a coolant inlet reservoir at the top 310 and a coolant outlet reservoir at the bottom 316. Similar to the desiccant, a coolant, or a second cooling fluid, can flow through the LAMEE 300 from top to bottom or from bottom to top. The coolant can provide additional cooling to the air flowing through the LAMEE 300 by cooling the desiccant. This is described further below in reference to FIGS. 9A-15C.

As an example, the LAMEE 300 may be similar to a LAMEE as described in WO 2011/161547, entitled "Liquid-To-Air Membrane Energy Exchanger," filed Jun. 22, 2011.

Figure 3:
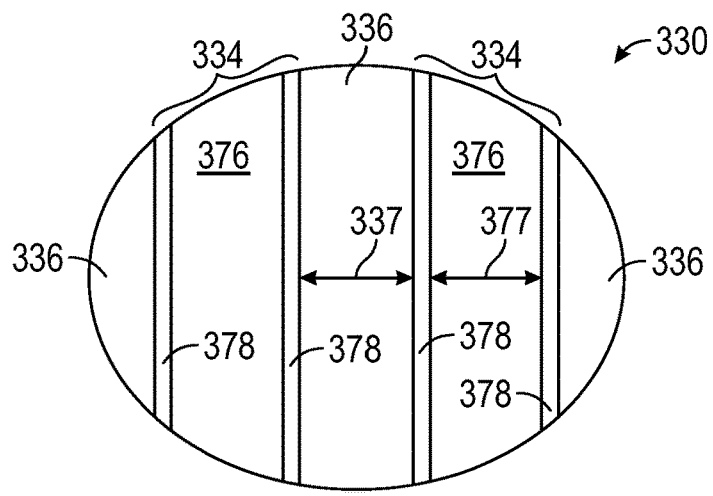
FIG. 3 is a cut-away front view of panels within an example energy exchange cavity of a liquid-to-air membrane energy exchanger in accordance with the present patent application.

FIG. 3 illustrates a cut-away front view of the panels 334 within the energy exchange cavity 330 of the LAMEE 300. The panels 334 may be solution or liquid panels configured to direct the flow of liquid, such as desiccant, therethrough, as explained below. The panels 334 form a liquid desiccant flow path 376 that is confined by semi-permeable membranes 378 on either side and is configured to carry desiccant therethrough. Each membrane 378 may be any flexible structure that may generally bulge under fluid pressure. The semi-permeable membranes 378 are arranged in parallel to form air channels 336 with an average flow channel width of 337 and liquid desiccant channels 376 with an average flow channel width of 377. In one example, the semi-permeable membranes 378 are spaced to form uniform air channels 336 and liquid desiccant channels 376. The air stream 332 (shown in FIG. 2) travels through the air channels 336 between the semi-permeable membranes 378. The desiccant in each desiccant channel 376 exchanges heat and moisture with the air stream 332 in the air channels 336 through the semi-permeable membranes 378. The air channels 336 alternate with the liquid desiccant channels 376. Except for the two side panels of the energy exchange cavity, each air channel 336 may be positioned between adjacent liquid desiccant channels 376.

It is noted that for purposes of the present application, semi-permeable and selectively permeable have the same meaning.

In order to minimize or otherwise eliminate the liquid desiccant channels 376 from outwardly bulging or bowing, membrane support assemblies may be positioned within the air channels 336. The membrane support assemblies are configured to support the membranes, and may promote turbulent air flow between the air channels 336 and the membranes 378.

In an example, an energy exchange cavity for use in a LAMEE can include a coolant channel that can be located between two liquid desiccant channels. The coolant channel can be configured to circulate a second cooling fluid to reject heat from the desiccant. This is described further below in reference to a liquid panel in FIGS. 9A-12.

Figure 4:
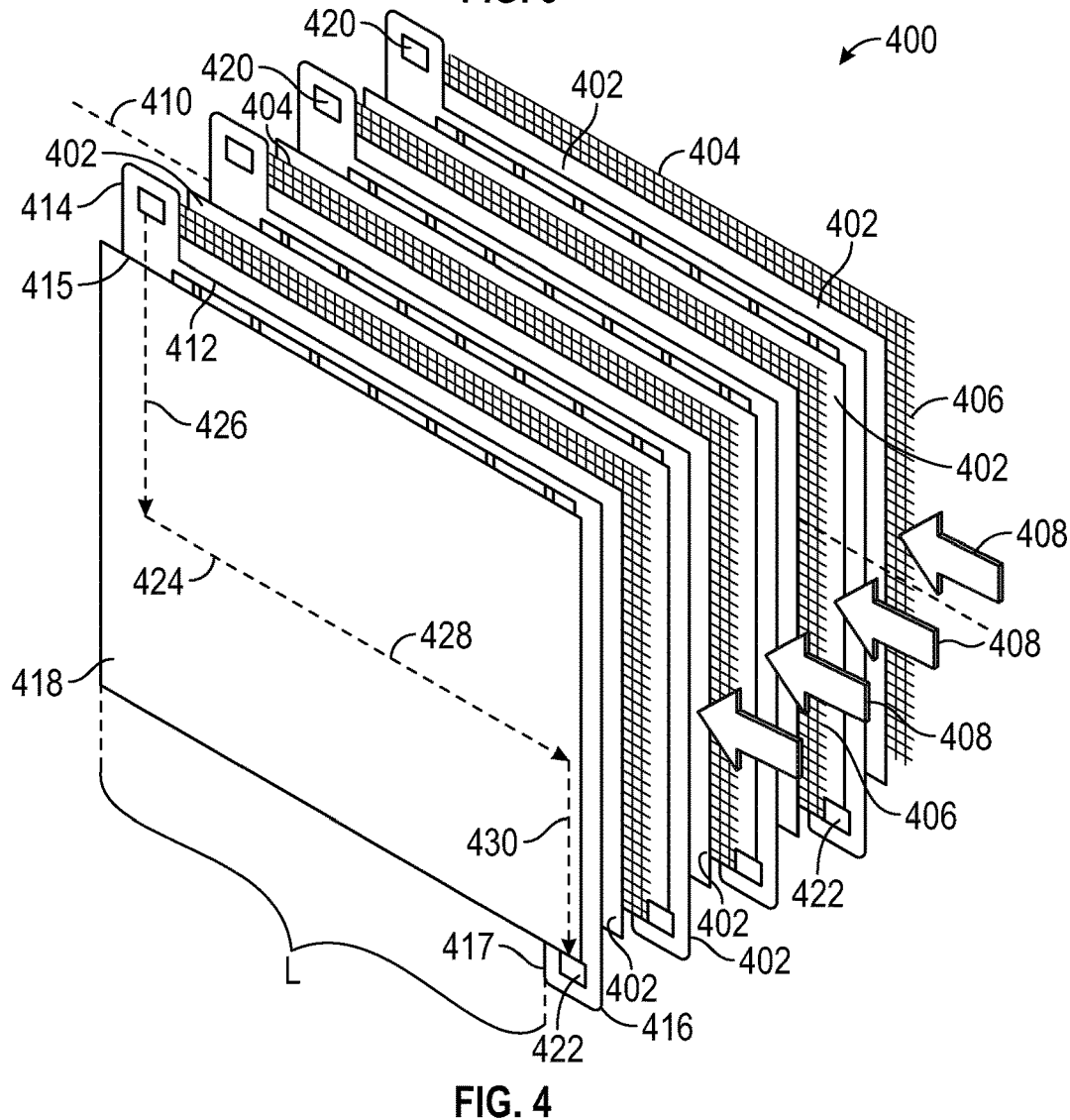
FIG. 4 is an exploded isometric top view of an example energy exchange cavity of a liquid-to-air membrane energy exchanger in accordance with the present patent application.

FIG. 4 illustrates an exploded isometric top view of an example of an energy exchange cavity 400. The energy exchange cavity 400 may include a plurality of liquid panel assemblies 402 spaced apart from one another by membrane support assemblies 404, such as those described in U.S. patent application Ser. No. 13/797,062, entitled "Membrane Support Assembly for an Energy Exchanger," filed Mar. 12, 2013, and published as US Pub. No. US 2014/0054004. The membrane support assemblies 404 may reside in air channels 406. For example, the membrane support assemblies 404 may prevent membranes 418 of the solution panel assemblies 402 from outwardly bulging or bowing into the air channels 406. Airflow 408 is configured to pass through the air channels 406 between liquid panel assemblies 402. As shown, the airflow 408 may generally be aligned with a horizontal axis 410 of the energy exchange cavity 400. Thus, the airflow 408 may be horizontal with respect to the energy exchange cavity 400. Notably, however, the membrane support assemblies 404 may include turbulence promoters configured to generate turbulence, eddies, and the like in the airflow 408 within the energy exchange cavity 400.

Each liquid panel assembly 402 may include a support frame 412 connected to an inlet member 414 at an upper corner 415 and an outlet member 416 at a lower corner 417 that may be diagonal to the upper corner 415. Further, membranes 418 are positioned on each side of the support frame 412. The membranes 418 sealingly engage the support frame 412 along outer edges in order to contain liquid within the liquid panel assembly 402. Alternatively, a single membrane may sealingly wrap around an entirety of the support frame 412.

Each inlet member 414 may include a liquid delivery opening 420, while each outlet member 416 may include a liquid passage opening 422. The liquid delivery openings 420 may be connected together through conduits, pipes, or the like, while the liquid passage openings 422 may be connected together through conduits, pipes, or the like. Optionally, the inlet members 414 and outlet members 416 may be sized and shaped to directly mate with one another so that a liquid-tight seal is formed therebetween. Accordingly, liquid, such as desiccant may flow through the liquid delivery openings 420 and the liquid passage openings 422. The inlet members 414 and outlet members 416 may be modular components configured to selectively couple and decouple from other inlet members 414 and outlet members 416, respectively. For example, the inlet members 414 and outlet members 416 may be configured to securely mate with other inlet members 414 and outlet members 416, respectively, through snap and/or latching connections, or through fasteners and adhesives.

As shown, the liquid panel assemblies 402, the membrane support assemblies 404, and the air channels 406 may all be vertically oriented. The liquid panel assemblies 402 may be flat plate exchangers that are vertically-oriented with respect to a base that is supported by a floor, for example, of a structure.

Alternatively, the liquid panel assemblies 402, the membrane support assemblies 404, and the air channels 406 may all be horizontally oriented. For example, the liquid panel assemblies 402 may be flat plate exchangers that are horizontally-oriented with respect to a base that is supported by a floor, for example, of a structure.

In operation, liquid, such as desiccant, flows into the liquid delivery openings 420 of the inlet members 414. For example, the liquid may be pumped into the liquid delivery openings 420 through a pump. The liquid then flows into the support frames 412 through a liquid path 424 toward the outlet members 416. As shown, the liquid path 424 includes a vertical descent 426 that connects to a horizontal, flow portion, such as a flow portion 428, which, in turn, connects to a vertical descent 430 that connects to the liquid passage opening 422 of the outlet member 416. The vertical descents 426 and 430 may be perpendicular to the horizontal, flow portion 428. As such, the liquid flows through the solution panel assemblies 402 from the top corners 415 to the lower corners 417. As shown, the length of the horizontal, flow portion 428 substantially exceeds half the length L of the liquid panel assemblies 402. The horizontal, flow portion 428 provides liquid, such as desiccant, that may counterflow with respect to the airflow 408. Alternatively, the flow portion may be a crossflow, parallel-aligned flow, or other such flow portion, for example.

The airflow 408 that passes between the liquid panel assemblies 402 exchanges energy with the liquid flowing through the liquid panel assemblies 402. The liquid may be a desiccant, refrigerant, or any other type of liquid that may be used to exchange energy with the airflow 408.

In an example, an energy exchange cavity can include a second cooling liquid. The second cooling liquid can be a separate fluid circuit from the fluid circuit of the desiccant. In an example, the second cooling liquid can be circulated through the liquid panel assembly 402 through a coolant channel that can be sandwiched between two desiccant channels that can carry the first cooling liquid or desiccant described above. (See FIGS. 9A-12 and the description below.) In an example, the second cooling liquid can be circulated through vertical tubes that can form a part of the support structure of the support frame 412. (See FIGS. 13-15C and the description below.)

The energy exchange cavity 400 may include more or less liquid panel assemblies 402, membrane support assemblies 404, and air channels 406 than those shown in FIG. 3. The inlet and outlet members 414 and 416 may be modular panel headers that are configured to selectively attach and detach from neighboring inlet and outlet members 414 and 416 to provide a manifold for liquid to enter into and pass out of the liquid panel assemblies 402. Sealing agents, such as gaskets, silicone gel, or the like, may be disposed between neighboring inlet members 414 and neighboring outlet members 416. At least a portion of the membrane sealingly engages the inlet and outlet members 414 and 416. The liquid panel assembly 402 formed in this manner provides a fully-sealed, stand-alone unit having openings at the inlet and outlet members 414 and 416, notably the openings 420 and 422, respectively. Accordingly, the liquid panel assembly 402 may be pre-tested for leaks and membrane holes prior to being positioned within an energy exchange cavity, for example.

The liquid panels in the present application are configured to balance internal liquid hydrostatic pressure and frictional forces. As such, the total pressure within the liquid panel assemblies may be reduced, negated or otherwise neutralized. A liquid panel assembly may be configured, through selection of a number, orientation, shape, and/or the like of flow channels or passages, to ensure that pressure within the assembly is substantially reduced, negated, or otherwise neutralized. That is, the pressure may be reduced, negated, or otherwise neutralized to a greater extent than a negligible amount. Thus, membrane bulge is substantially reduced (that is, more than a negligible amount) or eliminated, which reduces the potential for leaks and membrane creep.

FIG. 5 illustrates a front view of the support frame 412 of the liquid panel assembly 400, according to an example. For the sake of clarity, the membranes 418 secured to the liquid panel assembly 400 are not shown. However, it is to be understood that at least one membrane 418 is bonded to the front and back surfaces of the support frame 412. For example, the membrane 418 may be continuously bonded around the perimeter of the support frame 412, thereby creating a robust external seal.

The support frame 412 includes a main body 438 having a lower edge 440 connected to an upper edge 442 through lateral edges 444. The support frame 412 may be formed of various materials, such as injection molded plastic, metal, or a combination thereof. The support frame 412 may be integrally formed and manufactured as a single piece through a single molding process, for example. For example, the inlet and outlet members 414 and 416, respectively, may be integrally molded with the support frame 412. Optionally, the support frame 412 may be formed as separate and distinct pieces. For example, the support frame 412 may be extruded and assembled from various parts.

The inlet member 414 includes a base 446 that connects to a support inlet 448 proximate the upper corner 415. The upper corner 415 may include a channel configured to receive and retain the base 446. For example, the base 446 may fit into the channel and be securely fastened therein, such as through fasteners, adhesives, or the like. Optionally, as noted above, the base 446 may simply be integrally formed and molded with the upper corner 415. The base 446 supports and connects to an upper wall 449 through lateral walls 450. The base 446, the upper wall 449, and the lateral walls 450 define the liquid-delivery opening 420. Liquid passages (hidden from view in FIG. 5) are formed through the base 446 and connect the liquid-delivery opening 420 to a liquid-reception area 452 formed at the upper corner 415 of the support frame 412.

FIG. 6 illustrates an isometric top view of the inlet member 414, according to an example. As shown, a lower edge 460 of the base 446 may be tapered or beveled, which allows the base 446 to be easily mated into a reciprocal channel of the support inlet 448 (shown in FIG. 5). An opening 462 is formed at a terminal end of the beveled lower edge 460. The opening 462 connects to liquid passages (hidden from view in FIG. 6) that connect to an opening (hidden from view in FIG. 6) that connects to the liquid delivery opening 420. Accordingly, liquid may pass from the liquid delivery opening 420, out through the opening 462 of the base 446 and into the support inlet 448 of the support frame 412.

FIG. 7 illustrates an internal view of the inlet member 414, according to an example. As shown in FIG. 7, the opening 462 is in communication with a plurality of liquid passages 470 separated by guide ribs 472. The liquid passages 470 are configured to align with liquid inlet channels of the support frame 412. While eight liquid passages 470 are shown in FIG. 7, more or less liquid passages 470 may be used, depending on the number of liquid inlet channels of the support frame 412.

Referring again to FIG. 5, the outlet member 416 is similarly constructed to the inlet member 414. The inlet and outlet members 414 and 416 are both liquid connection members configured to deliver and/or pass liquid to and/or from the support frame 412. Accordingly, similar to the inlet member 414, the outlet member 416 includes a base 446 that connects to a support outlet 480 of the support member 412 proximate the lower corner 417. The lower corner 417 may include a channel configured to receive and retain the base 446. For example, the base 446 may fit into the channel and be securely fastened therein, such as through fasteners, adhesives, or the like. Optionally, as noted above, the base 446 may simply be integrally formed and molded with the lower corner 417. The base 446 supports and connects to an upper wall 449 through lateral walls 450. The base 446, the upper wall 449, and the lateral walls 450 define the liquid-delivery opening 422. Liquid passages (hidden from view in FIG. 5) are formed through the base 446 and connect the liquid-delivery opening 422 to a liquid-passage area 482 formed at the lower corner 417 of the support frame 412. The outlet member 416 may be constructed as shown in FIGS. 6 and 7.

The inlet and outlet members 414 and 416 provide panel headers that are configured to provide passageways for liquid, such as desiccant, to pass into and out of the liquid panel assembly 402. The inlet and outlet members 414 and 416 may also provide mating surfaces to neighboring panels to create a manifold to distribute liquid to all solution panels within an energy exchanger.

Figure 8:
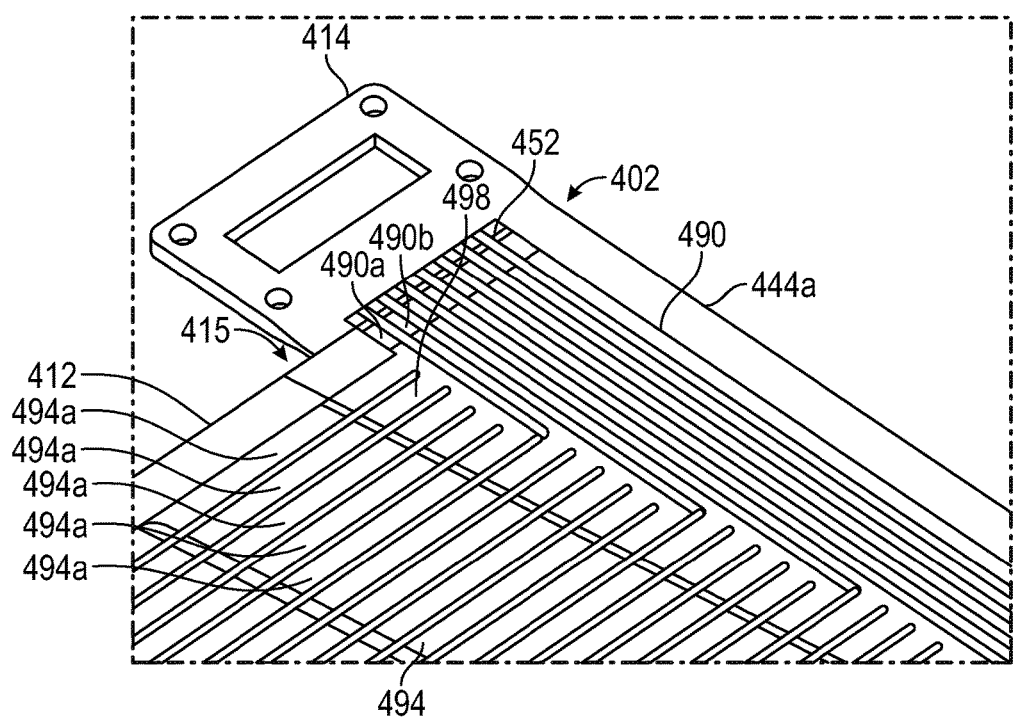
FIG. 8 is an isometric view of an area proximate an upper corner of a support frame of a liquid panel assembly in accordance with the present patent application.

FIG. 8 illustrates an isometric view of an area proximate the upper corner 415 of the support frame 412 of the liquid panel assembly 402. Referring to FIGS. 5 and 8, the support frame 412 includes vertical inlet channels 490 connected to vertical outlet channels 492 through horizontal flow passages 494. As shown, the support frame 412 may include eight vertical inlet channels 490 and eight vertical outlet channels 492. However, the support frame 412 may include more or less inlet and outlet channels 490 and 492 than those shown. Each inlet channel 490 may connect to five horizontal flow passages 494. For example, the innermost inlet channel 490 a connects to the top five horizontal flow passages 494 a. Similarly, the inlet channel 490 b connects to the five horizontal flow passages 494 below the top five horizontal flow passages 494 a. Similarly, the top five flow passages 494 a connect to an outermost vertical outlet channel 492 a. Accordingly, the horizontal flow passages 494 may be staggered in sets of five with respect to the support frame 412. For example, inlet ends 498 of the horizontal flow passages 494 a are farther away from the lateral edge 444 a of the support frame 412 than the inlet ends 498 of the set of horizontal flow passages 494 immediately below the set of horizontal flow passages 494 a. However, outlet ends 499 of the horizontal flow passages 494 a are closer to the lateral edge 444 b of the support frame 412 than the outlet ends 499 of the set of horizontal flow passages 494 immediately below the set of horizontal flow passages 494 a. Further, the length of the inlet channel 490 a is shorter than the length of the inlet channel 490 b adjacent the inlet channel 490 a. The length of the inlet channel 490 b is longer in order to connect to the set of five horizontal flow passages 494 underneath the set of five horizontal flow passages 494 a. Conversely, the length of the vertical outlet channel 492 a is longer than the length of the vertical outlet channel 492 b immediately adjacent the vertical distribution channel 492 a.

The vertical inlet and outlet channels 490 and 492, respectively, provide continuous flow alignment vanes. Each channel 490 and 492 may be an isolated duct that allows the pressure of liquid in neighboring channels 490 and 492 to vary in order to evenly split the flow of liquid among the channels 490 and 492. As noted, each vertical distribution and passage channel 490 and 492 may feed a single horizontal flow passage 494, or a set or bank of horizontal flow passages 494. The membrane 418 (shown in FIG. 4) may also be bonded to internal edge surfaces of the support frame 412 to separate each vertical channel 490 and 492 from one another, as well as to separate each horizontal flow passage 494 from one another. Therefore, each fluid circuit, which includes an inlet channel 490, one or more flow passages 494, and an outlet channel 492, may be a separate, sealed duct.

Each of the inlet and outlet channels 490 and 492 may provide a flow alignment vane configured to direct liquid to flow along a particular path. The inlet and outlet channels 490 and 492 may be configured to provide support to the membrane. The inlet and outlet channels may be configured to provide a sealing surface for at least a portion of the membrane.

As shown in FIGS. 5 and 6, the horizontal flow passages 494 are grouped in sets of five, which are staggered with respect to one another. The sets of horizontal flow passages 494 are staggered so that the overall length of each horizontal flow passage 494 is the same. Indeed, the total length of each liquid circuit, which includes a vertical inlet channel 490 that connects to a horizontal flow passage 494, which in turn connects to a vertical outlet channel 492, is the same due to the staggered nature of the sets of horizontal flow passages 494 and the different lengths of each of the vertical inlet channels 490 and the vertical outlet channels 492. The total vertical height H of a liquid circuit is the length of a vertical inlet channel 490 plus the length of a vertical outlet channel 492 that connects to the vertical inlet channel 490 through a horizontal flow passage 494. The vertical inlet channel 490 a is the shortest, while the vertical outlet channel 492 a (which connects to the inlet channel 490 a through the fluid passages 494 a) is the longest. Conversely, the vertical inlet channel 490 n is the longest, while the vertical outlet channel 492 n (which connects to the inlet channel 490 n through the fluid passages 494 n) is the shortest. Further, the length of the vertical inlet channel 490 a may equal the length of the vertical outlet channel 492 n, while the length of the vertical inlet channel 490 n may equal the length of the vertical outlet channel 492 a. In short, the total vertical lengths for each liquid circuit may sum to H. Moreover, the total length of each liquid circuit, which includes a vertical inlet channel 490 that connects to a vertical outlet channel 492 through a horizontal fluid passage 494, may be equal.

While particular inlet and outlet channels 490 and 492, respectively, are each shown connecting to a set of five horizontal fluid passages 494, the inlet and outlet channels 490 and 492, respectively, may connect to more or less than five horizontal fluid passages 494. For example, the sets of horizontal fluid passages 494 may be two, three, six, seven, and the like. Further, each distribution and passage channel 490 and 492, respectively, may alternatively connect to only one horizontal fluid passage 494.

The liquid circuits are of equal length in order to provide for even distribution of liquid flow through the liquid panel assembly 402. The liquid panel assembly 402 is configured to operate at low pressure. That is, the liquid panel assembly 402 provides a low pressure assembly. The liquid that flows through the liquid panel assembly 402 has a particular weight and viscosity. For example, a desiccant is a dense fluid. The weight of the liquid creates fluid pressure. As the liquid flows from the top of the liquid panel assembly 402 to the bottom, the pressure from the weight of the liquid builds. As the liquid moves through the liquid panel assembly 402, the pressure is reduced through friction, for example. For example, the faster the speed of the liquid within a liquid circuit, the greater the friction between the liquid and walls of channels and passages that define the liquid circuit. Therefore, increasing the speed of the liquid, such as through pumping, increases the frictional force. Examples of the present disclosure provide a liquid panel assembly that balances the loss of pressure from friction with the pressure of the weight of the liquid.

The friction head loss, $h_f$, of a fluid flowing in a channel of length L is given by the following:

$$\frac{h_f}{L} = \frac{C\mu V}{2g\rho D_h^2}$$

where C is a coefficient that depends on the duct geometry (and may also be used to represent the friction of porous material in the duct), $\mu$ is the molecular viscosity of the fluid, V is the bulk speed of the fluid in the duct, g is the acceleration due to gravity, $\rho$ is the density of the fluid, and $D_h$ is the hydraulic diameter of the duct. The friction head loss may be synonymous with pressure drop ("head" refers to the height of a column of fluid that would produce the pressure), that is, $\Delta P = -\rho g h_f$.

Examples of the present disclosure provide a liquid panel assembly in which friction head loss may be the same or approximately the same as a drop in vertical elevation of the fluid as it flows downward in the channels, due to the gain in static pressure, which is given by $\Delta P = \rho g \Delta z$, where $\Delta z$ is the drop in vertical elevation (in the direction of gravity). Therefore, adding the two pressure changes together gives $\Delta P_{net} = \rho g (\Delta z - h_f)$. A closely balanced flow with low pressure would have $\Delta z \approx h_f$. Examples of the present disclosure provide pressure balancing channels at the ends of the panel that are oriented vertically, therefore, $\Delta z = L$. As such, the following may be consulted when selecting the size, shape, orientation, and the like of the fluid circuits:

$$\frac{h_f}{L} = \frac{C\mu V}{2g\rho D_h^2} \approx 1$$

However, complete balance as shown in the above equation is not necessarily required. Instead, the gauge pressure may be kept low enough to meet structural limitations of the membrane and support design (keeping membrane strain and stress within acceptable limits).

In an example, the weight of the liquid produces pressure in the vertical inlet and outlet channels 490 and 492, respectively. However, it has been found that increasing the number of horizontal fluid passages 494 connecting to particular inlet and outlet channels 490 and 492 increases the rate of fluid flow within the vertical inlet and outlet channels 490 and 492, respectively. Fluid velocity is directly proportional to friction. Thus, with increased fluid velocity, friction increases. The friction diminishes the overall pressure of the liquid within the liquid panel assembly 402. Therefore, by increasing the friction of the fluid with the walls of the channels and passages of the liquid panel assembly 402, the pressure is reduced. As an example, it has been found that connecting single vertical inlet and outlet channels 490 and 492, respectively, to sets of four or five horizontal fluid passages 494 may substantially or completely offset the pressure caused by the weight of a desiccant. Because different liquids have different densities and weights, the liquid panel assembly 402 may be configured to account for the differences in densities and weights. For example, the sets of horizontal flow passages 494 may be smaller, such as set of 2 or 3, for lighter liquids, than for heavier liquids. Therefore, a number of flow passages 494 within a set of multiple flow passages 494 connected to individual channels 490 and 492 may be based on and/or determined by a weight of the liquid that is configured to flow through fluid circuits that include the sets of liquid passages and channels 490 and 492. In general, examples of the present disclosure are configured to offset hydrostatic pressure gain of the liquid with friction pressure loss of the flowing liquid within one or more fluid circuits to minimize or eliminate pressure within a liquid panel assembly.

Additionally, the hydraulic diameters of the inlet and outlet channels 490 and 492, as well as the hydraulic diameters of the horizontal fluid passages 494, may be adjusted to balance liquid hydrostatic pressure with friction. For example, the hydraulic diameter of each channel or passage may be directly proportional to the velocity of liquid flowing therethrough. Thus, decreasing the hydraulic diameter of the channel or passage leads to an increased velocity of pumped liquid therethrough. As noted, increasing liquid velocity increases friction, which reduces the net pressure. Therefore, the hydraulic diameter of the channels 490 and 492 may be based on and/or determined, in part, by a weight of the liquid that is configured to flow through fluid circuits that include the channels 490 and 492. In addition to the number of horizontal flow passages 494 in a set that connect to individual vertical inlet and outlet channels 490 and 492, respectively, the hydraulic diameter of the channels 490 and 492, as well as the flow passages 494 may be sized and shaped to generate a desired friction with respect to a particular liquid.

Thus, the liquid panel assembly 402 includes liquid circuits that are configured to balance the force of liquid hydrostatic pressure and friction by adjusting the number of horizontal flow passages 494 that connect to the vertical inlet and outlet channels 490 and 492, respectively, and/or the hydraulic diameter of the channels and/or passages, in order to reduce the net pressure within the liquid panel assembly 402.

The hydraulic diameters of the horizontal fluid passages 494 may be relatively wide compared to the vertical inlet and outlet channels 490 and 492, respectively. As such, the friction in relation to the liquid in the horizontal fluid passages 494 may be relatively small compared to the vertical inlet and outlet channels 490 and 492, respectively. The pressure drop in the horizontal fluid passages 494 may be relatively small. Because less friction in the horizontal flow passages 494 may be desired, the hydraulic diameters of the flow passages 494 may be wider than the hydraulic diameters of the vertical inlet and outlet channels 490 and 492, respectively. Therefore, the balancing of liquid hydrostatic pressure and friction may be achieved through the velocity of liquid through the vertical inlet and/or outlet channels 490 and 492, respectively, which may be controlled through the number of horizontal flow passages 494 connecting to each channel 490 and 492, and/or the hydraulic diameters of the channels 490 and 492.

FIGS. 9A-12 illustrate an example of a liquid panel 500 for use in a liquid to air membrane energy exchanger (LAMEE), such as those described above. The liquid panel 500 can be a low pressure liquid flow panel and can be configured for use in a three-fluid LAMEE. The liquid panel 500 can be configured to circulate a first cooling fluid, or a desiccant, through the panel 500 and a second cooling fluid, or a coolant, through the panel 500. The liquid panel 500 can be used in a LAMEE for any type of liquid cooling application, including but not limited to, data center cooling, condenser heat rejection, HVAC, etc.

FIGS. 9A and 9B illustrate the liquid panel 500 as assembled for use in the LAMEE. The liquid panel can include a desiccant inlet header 502 located at a top portion 504 of the frame 506 of the panel 500, a desiccant outlet header 508 located at a bottom portion 510 of the frame 506 on the opposite side, a coolant inlet header 512 located at the top portion 504 of the frame 506 opposite to the desiccant inlet header 502, and a coolant outlet header 514 located at the bottom portion 510 of the frame 506 opposite to the desiccant outlet header 508. In another example, the desiccant inlet headers 502 and the coolant inlet header 512 can be located in the same corners of the frame 506; similarly, the desiccant outlet header 508 and the coolant outlet header 514 can be in the same corners on the frame 506.

The liquid panel 500 can include a first semi-permeable membrane 520 which can be attached to the frame 506 of the panel 500. The liquid panel 500 can include a second semi-permeable membrane 522 (see FIGS. 10A and 10B)

which can be attached to the frame 506 on an opposite side of the panel 500. The semi-permeable membranes 520, 522 can form the outer layers of the liquid panel 500 and can be similar to the membranes 378 described above and shown in FIG. 3. The semi-permeable membranes 520, 522 can be configured to be vapor permeable such that heat and vapor can pass through the membranes 520, 522. The liquid panel 500 can include a support structure or support frame 540 (see FIG. 11) that can be part of the overall frame 506 or attached to the overall frame 506. The support structure 540 can include a plurality of horizontal and vertical members in which each of the horizontal members intersects with each of the vertical members and vice versa. Assembly of the panel 500 with the membranes 520, 522, the films 524, 526, and the support structure 540 is described below.

As shown in FIGS. 9A and 9B, the desiccant inlet header 502 can include a first desiccant inlet port 516 and a second desiccant inlet port 518, which can each be in fluid connection with desiccant flow channels (see FIGS. 10 and 10B) that can deliver the desiccant from the top 504 to the bottom 510 of the panel 500.

Figure 10A:
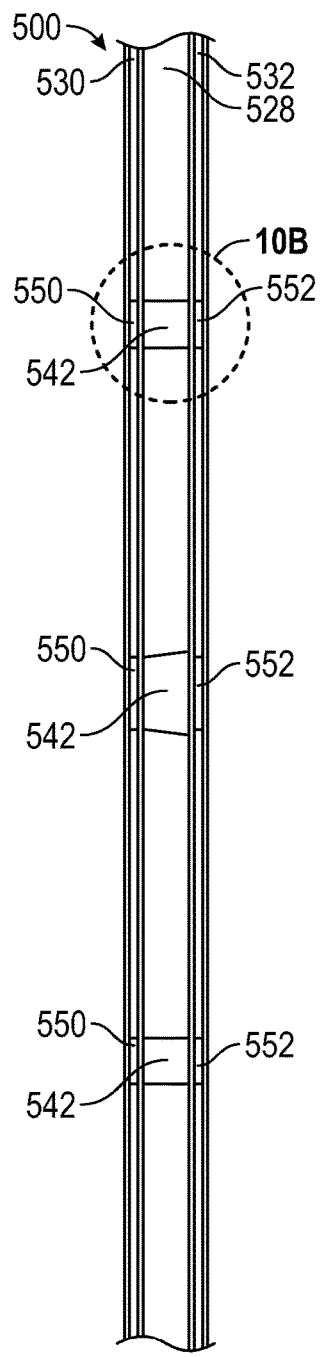
FIGS. 10A and 10B are cross sectional views of the liquid panel assembly of FIG. 9A in accordance with the present patent application.
Figure 10B:
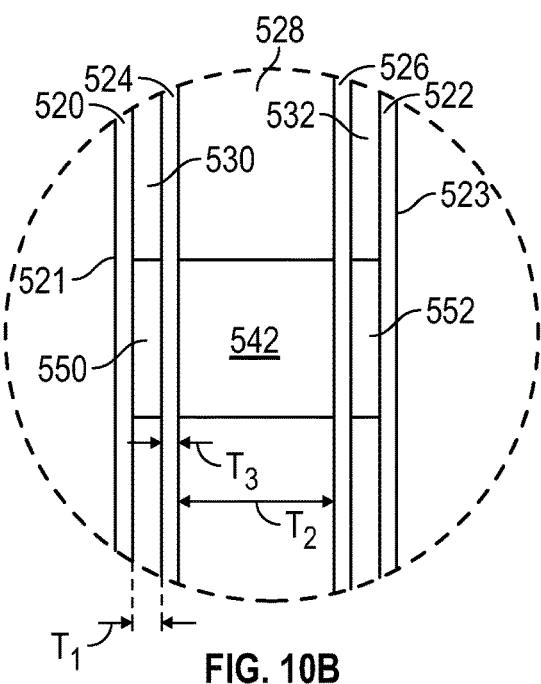

FIGS. 10A and 10B show a vertical cross section of a middle portion of the assembled liquid panel 500 of FIG. 9A taken between a first side and a second side of the panel 500. A first film 524 and a second film 526 can be sandwiched between the first and second membranes 520, 522. The first and second films 524, 526 can be impermeable films to separate the coolant from the desiccant.

The first and second films 524 and 526 can form a coolant channel 528 for receiving the coolant from the coolant inlet header 512. A first desiccant channel 530 can be formed between the first membrane 520 and the first film 524. A second desiccant channel 532 can be formed between the second film 526 and the second membrane 522. The desiccant can thus flow through the panel 500 on both sides of the panel 500, via the first desiccant channel 530 and the second desiccant channel 532. An external side 521 of the first membrane 520 and an external side 523 of the second membrane 522 can each be in contact with the air flowing through the exchanger or LAMEE when the liquid panel 500 is used in the exchanger.

The liquid panel assembly of FIGS. 4-8 (and further described in US Pub No 2014/0054013) discloses design of a liquid panel that includes an injected molded panel and two membranes to create flow distribution channels and facilitate regulation of the liquid at low pressures. The panel 500 can be configured, using a similar injection molded panel (see the support structure 540 shown in FIG. 11) to form the coolant channels. The panel 500 can be configured to include a second support structure formed on or around each of the films 524, 526 (see FIG. 12), and to which the membranes 520, 522 can attach, to form the desiccant channels. The desiccant and the coolant can each flow vertically down the panel 500 and then across the panel 500 in a generally horizontal direction. Multiple rows of generally horizontal desiccant and coolant channels are formed within the assembled panel 500. The panel 500 can thus include flow distribution channels for both the desiccant and the coolant, which can be regulated for low fluid pressures.

FIGS. 10A and 10B show a portion of the support structure 540 between the films 524 and 526 and a portion of the second support structure between each of the membrane 520 or 522 and the adjacent film 524 or 526. In FIG. 10A, four horizontal flow channels are visible across the panel 500 for each of the fluid circuits—the desiccant in the first desiccant channel 530, the desiccant in the second desiccant channel 532, and the coolant in the coolant channel 528. Each horizontal flow channel can be separated by a corresponding support structure. FIG. 10A includes three horizontal support members 542 which can be part of the support structure 540. (The vertical support members are not visible in FIGS. 10A and 10B.) In an example, the support structure 540 can be an injection molded panel. The support structure 540 can be sandwiched between the first film 524 and second film 526 to create a plurality of gaps or channels for the coolant to flow through (the coolant channel 528). The support structure 540 can also hold the films 524 and 526 apart from each other. FIG. 10A includes three support features 550 that are part of the second support structure located between the first membrane 520 and the first film 524, and three support features 552 that are part of the second support structure between the second membrane 522 and the second film 526. The space between the membrane and the film, created by the support structures 550 and 552 can create a plurality of gaps or channels for the desiccant to flow through (the desiccant channels 530,532) on both sides of the coolant channel 528.

When the liquid panel 500 is used in the exchanger or LAMEE, the first desiccant channel 530 and the second desiccant channel 532 can condition an air stream passing through an exchanger or LAMEE. The air can pass in a horizontal direction along and across the surface of the semi-permeable membranes 520, 522 that form the sides of the panel 500. The desiccant flowing through the desiccant channels 530, 532 can condition the air stream. Vapor and heat can pass through the semi-permeable membranes 520, 522 to condition the air with the desiccant in the channels 530 and 532. The coolant, or second cooling fluid, passing through the coolant channel 528 can absorb heat from the desiccant and cool the desiccant. The coolant can provide additional cooling capabilities for the liquid panel 500 in the LAMEE.

Since the air flows horizontally across the surfaces of the membranes 520, 522 and the liquid streams (desiccant and coolant) flow horizontally, in an example, the panel 500 can have a counter-flow configuration. In an example, the coolant can flow counter to the air flow and desiccant flow. In another example, the desiccant can flow counter to the coolant flow and air flow. In an example, the desiccant and coolant can flow in the same direction, but opposite or counter to the air flow. In some examples, the desiccant and coolant flows can be counter to each other to provide space for the inlet and outlet headers at each corner of the panel 500.

In an example, the desiccant channels 530, 532 can be filled with a wicking material, which can help to distribute the desiccant across all or more of the transfer surface, relative to if a wicking material were not present. In an example, the desiccant channels 530, 532 can be filled with a support mesh or other type of material or structure to minimize deformity or to prevent collapse of the desiccant channels 530, 532.

In an example, a thickness $T_1$ of the desiccant channel 530 can be about 0.5 mm, although it is recognized that in other examples the thickness $T_1$ can be more or less than 0.5 mm A thickness of the desiccant channel 532 can be similar to the thickness $T_1$. In an example, a thickness $T_2$ of the coolant channel 528 can be between about 1-3 mm, although it is recognized that in other examples the thickness $T_2$ can be less than 1 mm or more than 3 mm.

The first film 524 and the second film 526 can be formed of any type of impermeable material suitable for use with the coolant. In an example, the films 524, 526 can include, but are not limited to, one or more polymers. The polymers can include, but are not limited to, polyester, polypropylene, polyethylene (including high density polyethylene), nylon, polyvinyl chloride, polytetrafluoroethylene, and polyetheretherketone. In an example, the films 524, 526 can be formed of one or more metals or metal alloys. The metals can include any kind of conductive metal, including, but not limited to, copper, stainless, nickel, titanium, cupronickel, aluminum and combinations thereof. The films 524, 526 can be provided in a roll or a sheet form. A thickness T3 of the film 524 can range between about 0.025 mm to about 1 mm. The film 526 can have a thickness similar to the thickness T3.

In an example, the impermeable films 524, 526 can be sufficiently thin such that the films 524, 526 can provide low resistance to heat transfer. The use of thin films 524, 526 in the liquid panel 500 is facilitated by regulating the desiccant and coolant flow to low pressures.

The desiccant and coolant can be supplied at the inlet headers 502 and 508 at low pressures, for example less than 0.5 psi. Both the desiccant and coolant can be introduced at the top 504 of the panel 500 and run down the panel through the vertical channels by way of gravity. The panel 500 can be designed such that, in each of the two cooling circuits (for the desiccant and for the coolant), the vertical inlet and outlet channels and the horizontal flow passages are configured to balance the force of liquid hydrostatic pressure and friction. Such balance can reduce the net pressure within the panel 500. The desiccant and coolant can exit the outlet headers 508 and 514 at similarly low pressures to the inlet, for example less than 0.5 psi.

By comparison, other liquid panels commonly operate at fluid pressures of more than 5 psi or more than 10 psi. In a liquid panel design in which the desiccant or coolant could not be regulated to low pressures, the design described herein of the coolant channel 528, as well as the desiccant channels 530, 532, would not be feasible since the films 524, 526 could not withstand the higher fluid pressures. In that case, a different design including thicker and more robust materials would need to be used to accommodate a second fluid circuit for a second cooling fluid. Such thicker or robust materials would increase the resistance to heat transfer and reduce an overall heat exchange performance of the panel assembly.

The desiccant, or first cooling fluid, can be any type of liquid desiccant compatible with the membranes 520 and 522 and useful in conditioning air. The desiccant can be any liquid, including water, that is an evaporative or vapor exchange fluid. The coolant, or second cooling fluid, can be any type of heat transfer fluid, including water, glycol solutions, other anti-freeze fluids, oils, and compatible with the films 524 and 526. The types of liquid desiccants or coolants can include, but are not limited to, water, an acetate salt solution, a halide salt solution, a hygroscopic polyol based solution, a glycol based solution, a sulfuric acid solution, a phosphoric acid solution, and any combinations thereof. It is recognized that mixtures of desiccants can be used for the first cooling fluid or the second cooling fluid. It is recognized that in some cases the desiccant in the desiccant channels 530, 532 and the coolant in the coolant channel 528 can be interchangeable such that liquids suitable as the desiccant are suitable as the coolant.

The different terms "desiccant" and "coolant" are used herein to distinguish the two liquids from each other in terms of the position of each in the liquid panel 500. The coolant may also be referred to herein as an internal coolant. For differentiation, the two liquids can also be referred to herein as a first cooling fluid (or second overall fluid with the air being the first fluid) and a second cooling fluid (or third overall fluid), each of which is contained within a separate cooling circuit.

The liquid panel 500 can be used in a LAMEE for conditioning air, which can include cooling or dehumidifying the air passing through the LAMEE. It is recognized that the liquid panel 500 can also be used in a LAMEE for heating or humidifying the air. In that case, the coolant channel 528 can function as a heating channel and the coolant in the channel 528 can supply heat to the desiccant in the desiccant channels 530, 532 to heat or humidify the air.

In an example, the liquid panel 500 can be used in a LAMEE for evaporative cooling using water instead of desiccant. In such example, water can enter the panel 500 through the desiccant inlet header 502 (through the inlet ports 516 and 518) and flow through the desiccant channels 530, 532. In an example, the coolant, or second cooling fluid, flowing through the coolant channel 528, can be water or glycol and may be described herein as the internal coolant. The impermeable films 524, 526 and vapor permeable membranes 520, 522 can be configured the same as described above. Water flowing through the first and second desiccant channels 530, 532 can evaporate through the membranes 520, 522, respectively, and into the air stream flowing along and across the membranes 520,522. The evaporation can result in cooling of the coolant flow through the internal coolant channel 528, which can be sealed behind the impermeable film. The heat can be released from the coolant and out through both sides of the panel 500. The internal coolant can remain separate from the evaporating water flow and therefore can be kept clean. As such, the internal coolant can avoid being subject to mineral concentration, scaling, biofilm formation, etc. The design of the panel 500 (in which the coolant in the coolant channel 528 can be kept separate from the water in the desiccant channels 530, 532) can facilitate the use of glycols or other anti-freeze type agents as the coolant.

In such an example in which the LAMEE is an evaporative cooler, the LAMEE can be used to receive a hot fluid and reduce a temperature of such fluid passing through the LAMEE. The hot fluid can flow through the LAMEE as similarly described above in reference to the second cooling fluid. In a first mode of operation of the LAMEE, the hot fluid can enter the internal cooling channel 528 and be cooled in part by evaporation of water in the desiccant cooling channels 530, 532 to reject the heat to the air stream. In a second mode of operation, the water flow in the desiccant cooling channels 530, 532 can be turned off, in which case, the heat from the hot fluid in the internal cooling channel 528 can be rejected directly to the air stream as sensible heat. In a situation in which the outdoor air conditions are very cold, the air stream can be very cold which may cause freezing of the water in the desiccant cooling channels 530, 532 if water was being circulated through the LAMEE. By running the LAMEE in the second mode, the risk of water freezing in the LAMEE can be eliminated. The second cooling fluid in the internal cooling channel 528 can include a glycol or other anti-freeze agent.

Figure 11:
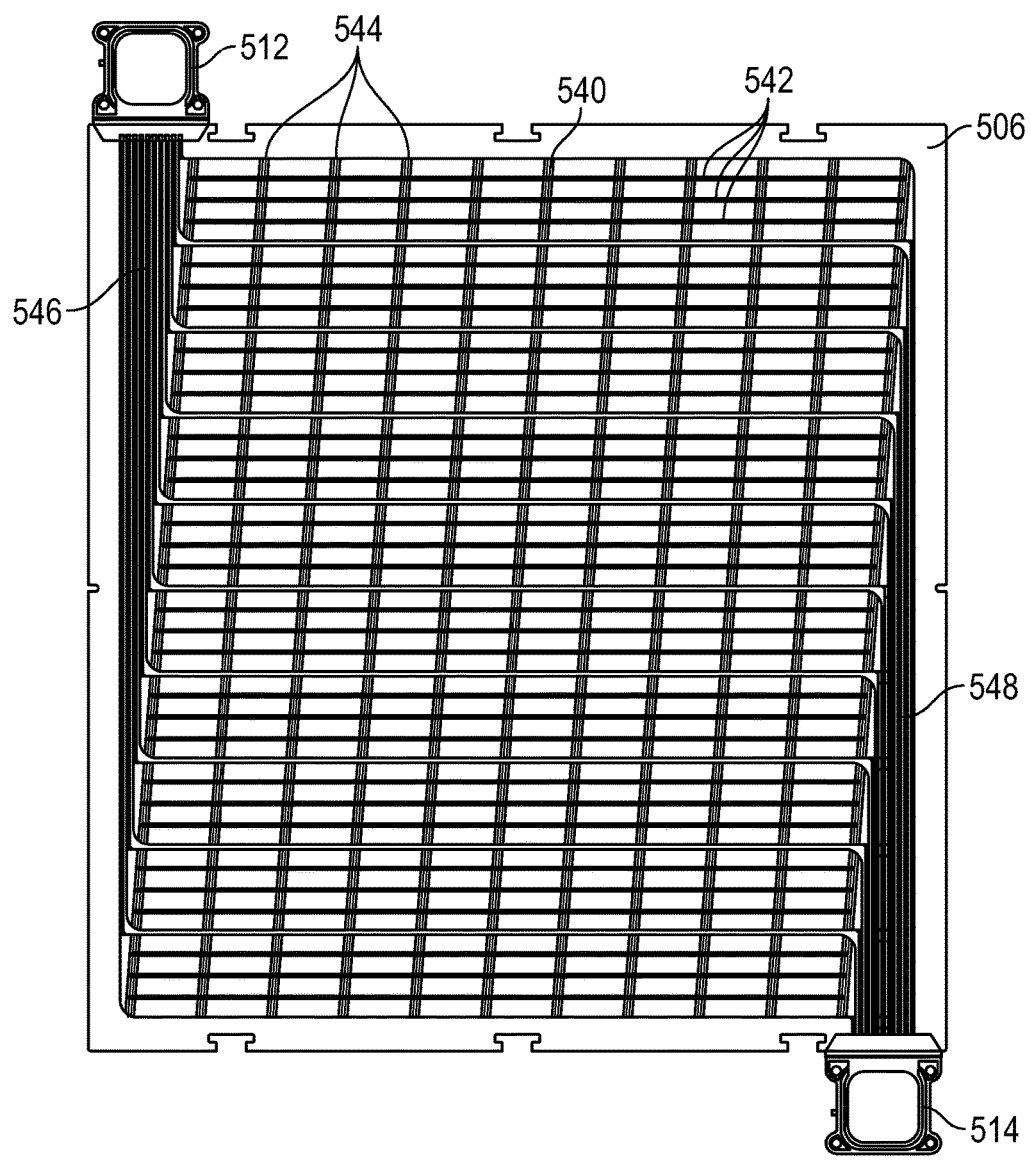
FIG. 11 is a side view of a partially assembly liquid panel assembly in accordance with the present patent application.

FIG. 11 shows the liquid panel 500 with the coolant inlet header 512 and the coolant outlet header 514 and without the films 524, 526, without the membranes 520, 522 and without the desiccant inlet header 502 and outlet header 508. As shown in FIG. 11, the liquid panel 500 can include the support structure or frame 540 which can include a plurality of horizontal support members 542 and a plurality of vertical support members 544. The support structure 540 can be connected to the frame 506 or integrally formed with the frame 506. In an example, the support structure 540 can be formed through injection molding. The frame 506 can include vertical channels 546 connected to the coolant inlet header 512 and vertical channels 548 connected to the coolant outlet header 508. The channels 546 can be configured to transport the coolant down and across the panel 500 and the channels 548 can be configured to transport the coolant down and out of the panel 500. In an example, the channels 546 and 548 can be open spaces in the frame 506 when the frame 506 is formed, for example, through injection molding. Such open spaces can become sealed channels when the films 524, 526 are attached to the panel 500.

To assembly the panel 500, the first film 524 and the second film 526 can each be attached to one side of the frame 506 as it is shown in FIG. 11. The impermeable films 524, 526 can be sealed to the frame 506 with an adhesive bonding process or another joining method, such as, for example, thermal bonding to attach film. The films 524, 526 can also be attached to the support structure 540 at a plurality of locations on the support structure 540. Once attached to the frame 506 and the support structure 540, the films 524 and 526 and the support structure 540 can be configured to provide impermeable channels for the coolant to flow through.

Figure 12:
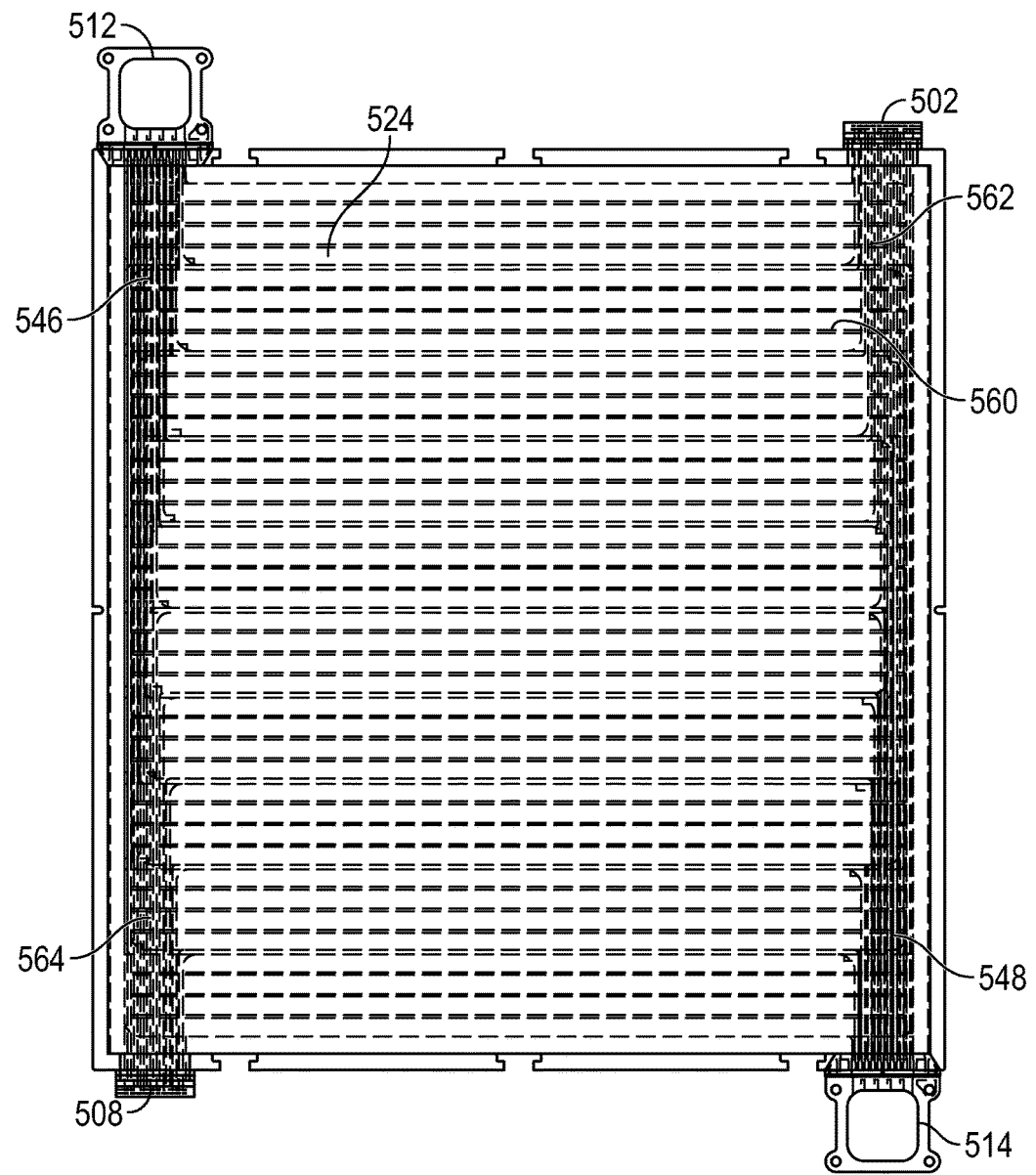
FIG. 12 is a side view of a partially assembly liquid panel assembly in accordance with the present patent application.

The desiccant channels can be formed by creating a structure or features on or around each of the films 524 and 526, attaching the membrane 520 to the film 524 and attaching the membrane 522 to the film 526. FIG. 12 shows the liquid panel 500 with the desiccant inlet header 502 and the outlet header 508 attached to the panel 500, with the film 524 attached to the panel (the film 526 can be attached but is not visible in FIG. 12), and a second support structure 560 formed on the film 524. The second support structure 560 can include the support features 550 of FIGS. 10A and 10B that can be arranged horizontally on the film 524. The second support structure 560 can also include support features to define vertical flow channels 562 from the desiccant inlet header 502 and vertical flow channels 564 to the desiccant outlet header 508. The second support structure 560 can create a gap or space between the film 524 and the membrane 520 once attached to define the desiccant flow channels. Although not shown, a second support structure can be formed on the film 526 for attachment of the membrane 522.

In an example, the second support structure 560 can be printed onto the film 524. A hard-curing adhesive can be used, or the supports can be printed in a polymer using a 3D printer. In an example, the membrane 520 can be directly attached to the film 524 by glue or heat bonding in a pattern that can be similar to the horizontal and vertical support members of the support frame 540. The desiccant channels can be formed between the membrane 520 and the film 524 when the membrane 520 bulges away from the film 524 under the liquid pressure, albeit small, of the first cooling fluid through the desiccant channels.

The membrane 520 can be attached to the frame 506 to form a liquid tight seal for fluid flow in the first desiccant channel 530. Similarly, the second membrane 522 can be attached to the frame 506 on the other side of the panel 500 to form the second desiccant channel 532. Once the membranes 520 and 522 are attached to the panel 500, the panel 500 can be in an assembled position as shown in FIG. 9A.

FIGS. 13-15C illustrate an example of a liquid panel 600 for use in a liquid to air membrane energy exchanger (LAMEE), such as those described above. The liquid panel 600 can have a desiccant channel created by a support structure located between two membranes, as described above in reference to FIGS. 2-8 (and in US Publication No. 2014/0054013). The liquid panel 600 can be used in a LAMEE for any type of liquid cooling application, including but not limited to, data center cooling, condenser heat rejection, HVAC, etc.

The liquid panel 600 can include a plurality of cooling tubes 601 that can be configured to circulate a coolant through the liquid panel 600. The coolant, or second cooling fluid, can be used in combination with a desiccant, or first cooling fluid, circulating through the liquid panel 600, to transfer heat between the coolant and the desiccant. In an example, the coolant in the tubes 601 can be a refrigerant, as discussed further below.

Figure 13:
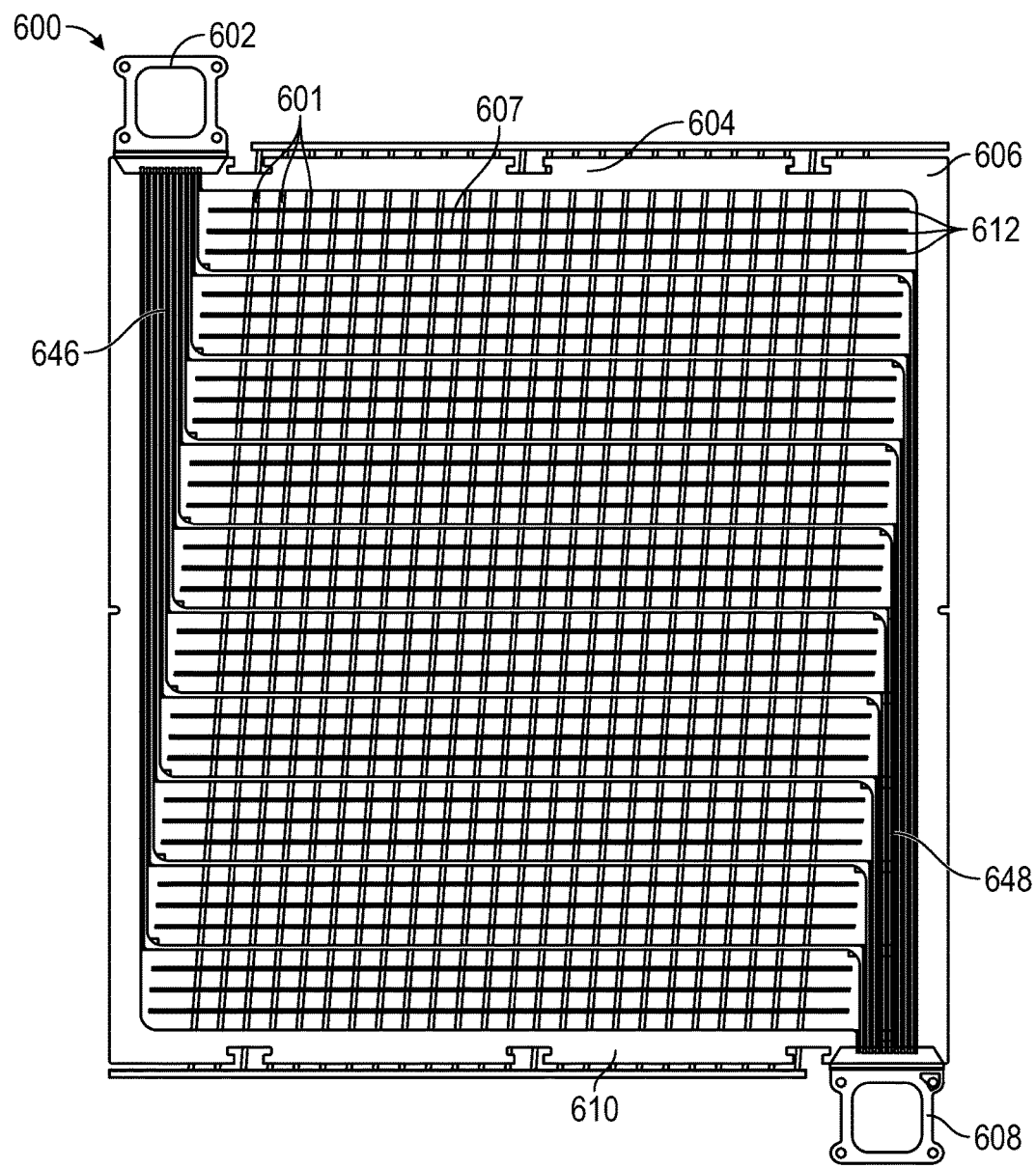
FIG. 13 is a side view of a liquid panel assembly in accordance with the present patent application.

FIG. 13 shows a side view of the liquid panel 600 in a partially assembled form. Although not shown in FIG. 13, the liquid panel 600, in an assembled form, can include a membrane sealed on each side of the panel 600 to create the desiccant channel. A desiccant can enter the panel 600 at a desiccant inlet header 602 at a top 604 of the panel 600 and exit the panel 600 at a desiccant outlet header 608 near an opposite corner at a bottom 610 of the panel 600. The panel 600 can include a frame 606 that can form a perimeter of the panel 600. The frame 606 can include a support structure 607 having a plurality of horizontal members 612 and the plurality of cooling tubes 601. (See FIG. 14C.) The support structure 607 can be attached to the overall frame 606 or integrally formed with the frame 606. The cooling tubes 601 can provide structural support to the panel 600 and circulate the coolant, or second cooling fluid.

The panel 600 can include a plurality of vertical channels 646 connected to the inlet header 602 and configured to transport the desiccant down and across the panel 600. The panel 600 can include a plurality of vertical channels 648 connected to the outlet header 608 and configured transport the desiccant down and out of the panel 600.

In an example, the plurality of tubes 601 can be arranged generally horizontally across the panel 600 and each cooling tube 601 can generally run a vertical length of the panel 600 from the top 604 to the bottom 610 of the panel 600. In an example, the tubes 601 can be oriented generally perpendicular to the horizontal members 612. As such, the tubes 601 can also be generally perpendicular to the desiccant channels formed between the membranes bonded to the frame 606. The tubes 601 may not necessarily be oriented at a 90 degree angle to the desiccant channels. As shown in FIG. 13, the tubes 601 can be oriented generally in a vertical direction on the panel although the tubes can be slanted or oriented at a small angle relative to a vertical plane. It is recognized that, in other examples, other orientations of the tubes 601, relative to the horizontal members 612 and the desiccant channels, can be used.

In an example, as shown in FIG. 13, the panel 600 can include twenty-four (24) cooling tubes 601. In an example, the plurality of tubes 601 can include approximately 10-20 tubes in the panel 600. In other examples, at least 30-50 tubes can be included in the plurality of tubes 601. It is recognized that the number of tubes included on a panel can vary and the ranges provided herein are exemplary and not limiting.

The plurality of tubes 601 can be part of the support structure 607 of the panel 600 and thus the desiccant flowing through each of the desiccant channels can flow around the plurality of tubes 601. The coolant or refrigerant circulating through the tubes 601 can provide cooling to the desiccant. The desiccant can flow in a horizontal direction across the panel 600. In an example, the desiccant can flow counter to the air flow, which passes in a horizontal direction along and across the surface of the membranes that form the sides of the panel 600. Because the tubes 601 carrying the coolant or refrigerant can be generally perpendicular to or at an angle to the direction of the air flow, the coolant or refrigerant can have a cross-flow orientation to the air flow.

Figure 14A:
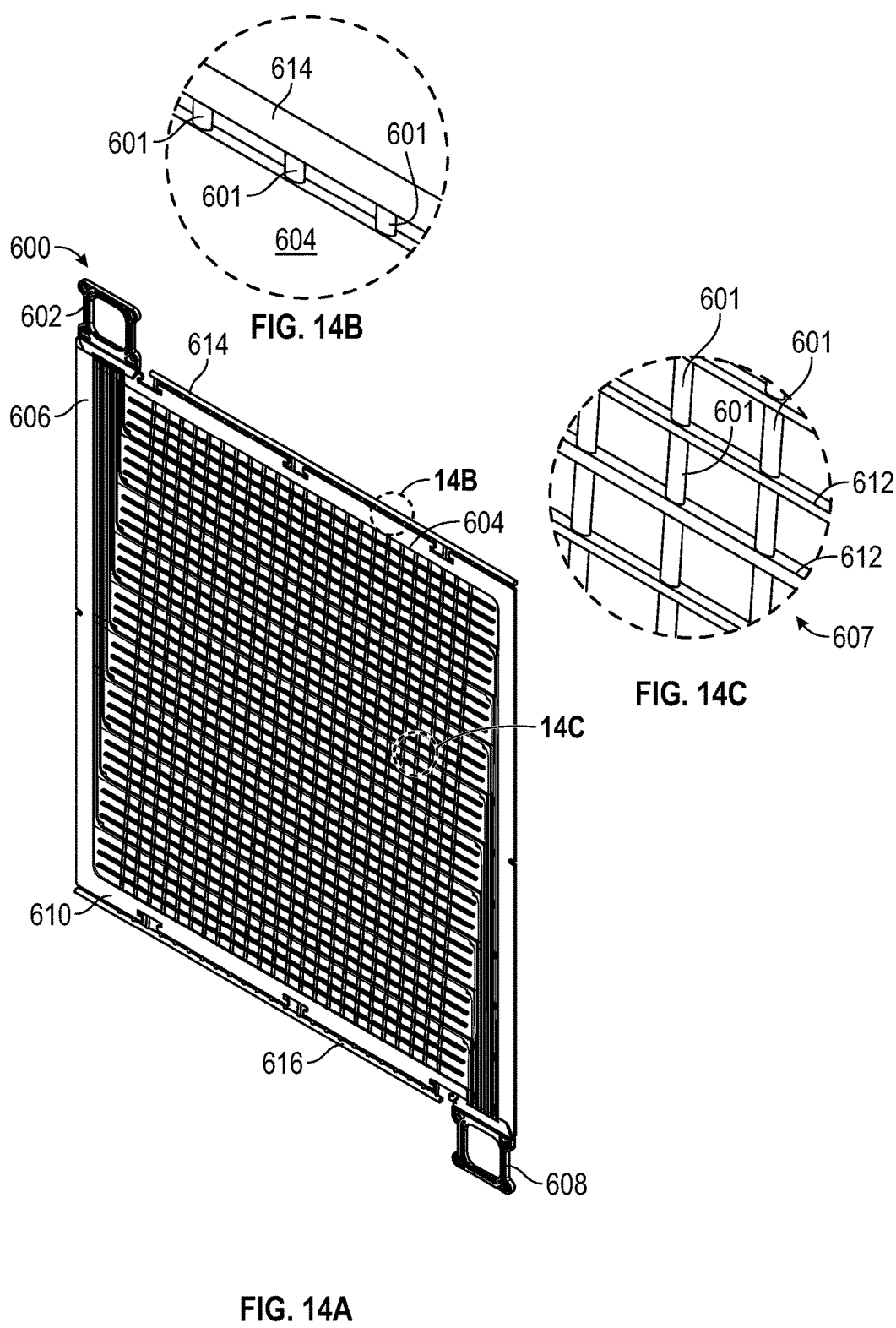

FIGS. 14A, 14B and 14C are perspective views of the panel 600 of FIG. 13. In an example, the tubes 601 can extend through the top 604 of the frame 606 and can be connected to a first manifold tube 614. The coolant or refrigerant can be transported to the manifold tube 614, which can deliver the coolant to each of the plurality of tubes 601. The coolant can flow through the tubes 601 from the top 604 to the bottom 610 of the panel 600. The tubes 601 can extend through the bottom 610 and can be connected to a second manifold tube 616, which can transport the coolant or refrigerant away from the panel 600. The coolant or refrigerant can be cooled back down and delivered back to the panel 600 through the manifold tube 614.

Figure 15A:
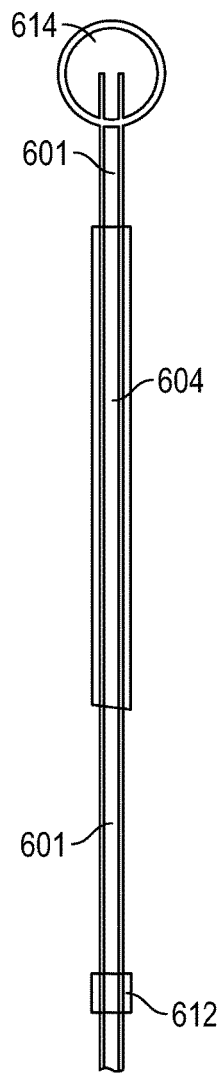
FIGS. 15A-15C are cross sectional views of the liquid panel assembly of FIG. 13 in accordance with the present patent application.
Figure 15B:
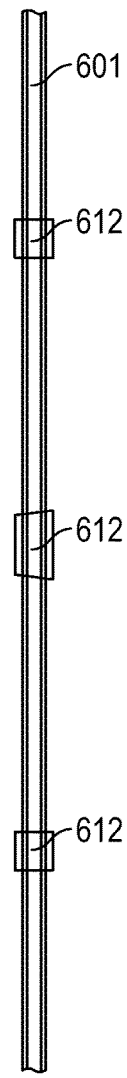
Figure 15C:
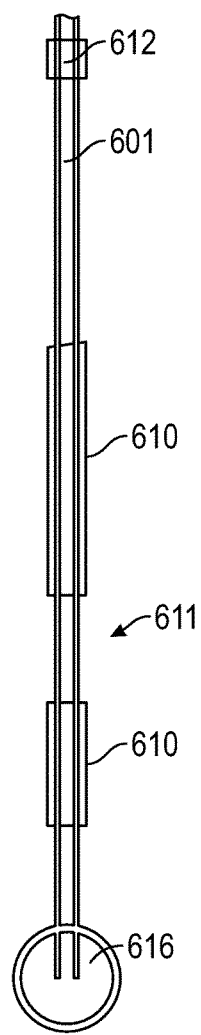

FIGS. 15A, 15B, and 15C are cross-sectional views of the liquid panel 600. FIG. 15A includes the top 604 of the frame 606, as well as the first manifold tube 614. FIG. 15C includes the bottom 610 of the frame 606, as well as the second manifold tube 616. (The cross-section was taken in FIG. 15C in a portion of the panel 600 in which the bottom 610 of the panel includes a notch 611.) FIG. 15B shows a middle portion of the frame 606 between the top 604 and bottom 610. FIG. 15B shows three horizontal members 612 formed around one of the plurality of tubes 601.

In an example, the coolant or refrigerant can be delivered to the panel through the second manifold tube 616 and the coolant can flow up through the tubes 601 and exit the panel 600 through the first manifold tube 614. It is recognized that other designs in addition to or as an alternative to the manifold tubes 614 and 616 can be used to transport the coolant to and from the panel 600.

The coolant or refrigerant circulated through the tubes 601 can be any type of fluid suitable for use in cooling (or heating) another fluid, which in this case is the desiccant, or first cooling fluid. The coolant can include any of the fluids described above in reference to the desiccant or coolant usable in the other example panels. The coolant or refrigerant can include, but is not limited to, water, steam, oil, glycol, other anti-freeze fluids, and refrigerants.

In an example, the liquid panel design 600 can be configured for use with a high pressure refrigerant or coolant. In an example, the cooling tubes 601 can be formed of a corrosion resistant, high strength material, including metals, such as, for example, titanium, and thus the tubes 601 can be suitable for use with a high pressure coolant, such as refrigerants used in vapor compression cooling. In an example, the coolant or refrigerant can be circulated through the tubes 601 at an operating pressure of up to about 60 bar, such as when a high pressure refrigerant is used. In an example, the coolant can be circulated through the tubes 601 at a lower operating pressure, such as about 100-150 psi, when other types of coolants, such as water or glycol are used.

In an example, the horizontal members 612 can be formed of a polymer or plastic. In an example, the horizontal members 612 can be formed through injection molding. An over-molding process can be used such that the horizontal members 612 can be formed around the tubes 601. In an example in which the panel 600 can be formed through injection molding, the tubes 601 can be provided and placed into the tooling or mold prior to forming the polymer portions of the panel 600. The horizontal members 612 can thus be formed around the tubes 601 to form the support structure 607 shown in FIG. 14C. In an example, the horizontal members 612 and the tubes 601 can be taken out of the mold as one piece. This can provide a streamlined process for manufacturing the support structure 607 for the panel 600. Moreover, the over-molding of the plastic or polymer frame with the cooling tubes can provide sufficient structural strength to the panel 600. It is recognized that other methods can be used for forming the horizontal members 612 around the tubes 601.

In an example, the cooling tubes 601 can provide all of the vertically-oriented structural support to the panel 600 and the cooling tubes 601 can be horizontally spaced from one end of the panel to the opposite end. In another example, vertical support members formed of a polymer or plastic (and similar to horizontal members 612) can be formed in an alternating pattern with the plurality of cooling tubes 601.

In an example, the cooling tubes 601 can have a generally circular cross-section. In other examples, the cross-section of the tubes 601 can have different shapes, including but not limited to, an elliptical or elongated shape. In some cases, the tubes 601 can be made thinner while still permitting room for adequate refrigerant flow. In an example, the cooling tubes 601 can be joined to each other with connecting webs of the corrosion resistance metal, for example, which can act as fins to conduct heat from the desiccant.

The flow of the first cooling fluid or desiccant through the assembled panel 600 can be configured as described above with regard to the energy exchange cavity 400 and liquid panel assemblies 402 of FIGS. 4-8. Thus the panel 600 can be pressure regulated in the same manner as the panel assembly 402 and include the same flow distribution channels for the desiccant. The panel 600 can be designed, as described above with reference to the panel assembly 402, such that the pressures used to distribute the desiccant through the panel 600 can be reduced. The panel 600 can be configured such that the hydrostatic pressure gain of the desiccant can be offset with the friction pressure loss.

The flow parameters of the desiccant (through the desiccant channels) and the coolant (through the tubes 601) can be controlled to optimize performance of the LAMEE or exchanger that the panel 600 is used in. The design of panel 600 can facilitate a reduction in the power needed to pump liquid through the exchanger, a reduction in the required volume of liquid desiccant, and improved exchanger effectiveness. The coolant or second cooling fluid can provide cooling to the air stream and there can be a reduction in the volume of desiccant needing to be pumped through the panel 600 to provide sufficient cooling. The panel 600 can be designed to operate with a lower volume of desiccant contained within the panel 600. It is recognized that additional benefits not specifically described herein may be realized through incorporation of the liquid panel designs described herein in an energy exchanger.

Although the liquid panel 600 is described above for use in cooling applications, it is recognized that the liquid panel 600 may be used in a LAMEE for providing heating or humidification. In such an example, the coolant in the cooling tubes 601 can be configured to heat the desiccant flowing through the desiccant channels of the panel 600.

The above description is intended to be illustrative, and not restrictive. For example, the above-described examples (or one or more aspects thereof) may be used in combination with each other. Other embodiments can be used, such as by one of ordinary skill in the art upon reviewing the above description.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The present application provides for the following exemplary embodiments or examples, the numbering of which is not to be construed as designating levels of importance:

Example 1 provides a liquid panel assembly comprising a support frame having a first fluid circuit having an inlet channel connected to an outlet channel through one or more flow passages, the first fluid circuit configured to receive a first cooling fluid to condition an air stream, and a second fluid circuit having an inlet and an outlet and configured to receive a second cooling fluid to transfer heat to or from the first cooling fluid, the second fluid circuit separate from the first fluid circuit. The liquid panel assembly further comprising a first semi-permeable layer secured to a first side of the support frame, and a second semi-permeable layer secured to a second side of the support frame opposite the first side. The first fluid circuit is configured to at least partially offset hydrostatic pressure gain with friction pressure loss of the first cooling fluid to reduce pressure within the liquid panel assembly.

Example 2 provides the liquid panel assembly of Example 1 optionally configured such that the first and second semi-permeable layers facilitate heat and vapor transfer through the first and second semi-permeable layers.

Example 3 provides the liquid panel assembly of Example 1 or 2 optionally further comprising a first film attached to the first side of the support frame and positioned between the support frame and the first semi-permeable layer and a second film attached to the second side of the support frame and positioned between the support frame and the second semi-permeable layer. A first space between the first film and the first semi-permeable layer forms a first portion of the first fluid circuit. A second space between the second film and the second semi-permeable layer forms a second portion of the first fluid circuit.

Example 4 provides the liquid panel assembly of Example 3 optionally configured such that the second fluid circuit is received through a third space formed between the first and second films.

Example 5 provides the liquid panel assembly of Example 3 or 4 optionally configured such that the second fluid circuit is configured to at least partially offset hydrostatic pressure gain with friction pressure loss of the second cooling fluid to reduce pressure within the liquid panel assembly.

Example 6 provides the liquid panel assembly of any of Examples 3-5 optionally configured such that each of the first and second films have a thickness ranging between about 0.025 mm and about 1 mm.

Example 7 provides the liquid panel assembly of any of Examples 1-6 optionally configured such that the inlet and outlet channels of the first fluid circuit are generally vertical and the one or more flow passages are generally horizontal.

Example 8 provides the liquid panel assembly of any of Examples 1-7 optionally configured such that the support frame comprises a plurality of tubes, each tube oriented in a generally vertical direction from a top to the bottom of the support frame, and wherein the second cooling fluid flows through each tube.

Example 9 provides the liquid panel assembly of Example 8 optionally configured such that horizontal members of the support frame are molded to the plurality of tubes, and a portion of each of the plurality of tubes is located within the first fluid circuit and the first cooling fluid flows around each of the plurality of tubes.

Example 10 provides the liquid panel assembly of Example 8 or 9 optionally configured such that the second cooling fluid is a high pressure refrigerant.

Example 11 provides an energy exchange system comprising a plurality of air channels configured to allow air to pass therethrough and a plurality of liquid panel assemblies alternately spaced with the plurality of air channels. Each of the plurality of liquid panel assemblies can include a support frame comprising a first fluid circuit configured to circulate a first cooling fluid through the liquid panel assembly and a second fluid circuit configured to circulate a second cooling fluid through the liquid panel assembly, the first fluid circuit separate from the second fluid circuit. Each of the plurality of liquid panel assemblies can include one or more sealing members secured to the support frame, an interior surface of the one or more sealing members in contact with the first cooling fluid or the second cooling fluid, and an exterior surface of the one or more sealing members in contact with an adjacent air channel of the plurality of air channels. The first fluid circuit is configured to at least partially offset hydrostatic pressure gain with friction pressure loss of the first cooling fluid to reduce pressure within the liquid panel assembly.

Example 12 provides the energy exchange system of Example 11 optionally further comprising a plurality of membrane support assemblies disposed within the plurality of air channels.

Example 13 provides the energy exchange system of Example 11 or 12 optionally configured such that air within the plurality of air channels is configured to counterflow with respect to the first cooling fluid in the first fluid circuit.

Example 14 provides the energy exchange system of any of Examples 11-13 optionally configured such that the one or more sealing members includes a first vapor permeable layer secured to the first side of the support frame and a second vapor permeable layer secured to a second side of the support frame opposite the first side.

Example 15 provides the energy exchange system of Example 14 optionally further comprising a first film sealed to the first side of the support frame and positioned between the support frame and the first vapor permeable layer and a second film sealed to the second side of the support frame and positioned between the support frame and the second vapor permeable layer. The first fluid circuit includes a first space between the first film and the first vapor permeable layer and a second space between the second film and the second vapor permeable layer.

Example 16 provides the energy exchange system of Example 15 optionally configured such that the second fluid circuit is received through an internal coolant channel formed between the first and second films.

Example 17 provides the energy exchange system of Examples 11-14 optionally further comprising a plurality of tubes, each tube oriented generally in a vertical direction and arranged within the support frame. Each of the plurality of tubes is configured to circulate the second cooling fluid.

Example 18 provides the energy exchange system of Example 17 optionally configured such that each of the plurality of tubes is arranged within the first fluid circuit and the first cooling fluid flows around each of the plurality of tubes.

Example 19 provides a liquid panel assembly configured to circulate a first cooling fluid and a second cooling fluid separately through the liquid panel assembly, the liquid panel assembly comprising a panel frame, a first film attached to a first side of the panel frame, a second film attached to a second side of the panel frame opposite the first side, the second film spaced apart from the first film to create a first channel for circulating the second cooling fluid through the panel frame, and at least one semi-permeable membrane secured to the panel frame and configured to allow vapor to pass through the at least one semi-permeable membrane. The first film is positioned between the at least one semi-permeable membrane and the second film, and the first film is spaced apart from the at least one semi-permeable membrane to create a second channel for circulating the first cooling fluid through the panel frame. The first cooling fluid is configured to condition an air stream and the second cooling fluid is configured to condition the first cooling fluid.

Example 20 provides the liquid panel assembly of Example 19 optionally configured such that the first and second films are spaced apart by a support structure having a plurality of intersecting horizontal and vertical members.

Example 21 provides the liquid panel assembly of Example 19 or 20 optionally configured such that each of the first and second films have a thickness ranging between about 0.025 mm and about 1 mm.

Example 22 provides the liquid panel assembly of any of Examples 19-21 optionally configured such that the at least one semi-permeable membrane includes a first semi-permeable membrane secured to the first side of the panel frame and a second semi-permeable membrane attached to the second side of the panel frame, wherein the first semi-permeable membrane and the first film form the second channel, and wherein the second semi-permeable membrane is spaced apart from the second film to create a third channel for circulating the first cooling fluid through the panel frame.

Example 23 provides the liquid panel assembly of Example 22 optionally configured such that a support structure is formed on one side of each of the first and second films to create the second and third channels, respectively.

Example 24 provides the liquid panel assembly of Example 23 optionally configured such that the support structure is printed on each of the first and second films, and the first and second semi-permeable membranes are bonded to the first and second films, respectively.

Example 25 provides the liquid panel assembly of any of Examples 19-24 optionally configured such that the first and second films facilitate heat transfer between the first and second cooling fluids and prohibit vapor transfer between the first and second cooling fluids.

Example 26 provides the liquid panel assembly of any of Examples 19-25 optionally further comprising a first inlet header at a top of the panel frame, a first outlet header at a bottom of the panel frame, a second inlet header at the top of the panel frame, and a second outlet header at the bottom of the panel frame. The first cooling fluid enters the panel assembly at the first inlet header, flows through the panel assembly, and exits the panel assembly at the first outlet header. The second cooling fluid enters the panel assembly at the second inlet header, flows through the panel assembly, and exits the panel assembly at the second outlet header.

Example 27 provides the liquid panel assembly of Example 26 optionally configured such that the first and second inlet headers are located at opposite sides on the top of the panel frame, and the first and second outlet headers are located at opposite sides on the bottom of the panel frame.

Example 28 provides the liquid panel assembly of any of Examples 19-27 optionally configured such that each of a first fluid circuit of the first cooling fluid and a second fluid circuit of the second cooling fluid are configured to at least partially offset hydrostatic pressure gain with friction pressure loss of each of the first and second cooling fluids to reduce pressure within the liquid panel assembly.

Example 29 provides the liquid panel assembly of Example 28 optionally configured such that the first fluid circuit and the second fluid circuit each flow in a generally horizontal direction across the liquid panel assembly.

Example 30 provides the liquid panel assembly of any of Examples 19-29 optionally configured such that the first cooling fluid is a liquid desiccant.

Example 31 provides the liquid panel assembly of any of Examples 19-29 optionally configured such that the first cooling fluid is water.

Example 32 provides a method of forming a liquid panel assembly configured to circulate a first cooling fluid and a second cooling fluid through the liquid panel assembly, the method comprising providing a panel frame having a support structure and a perimeter formed around the support structure, attaching a first film to a first side of the panel frame, attaching a second film to a second side of the panel frame opposite the first side, and attaching a membrane to the first film. The support structure can be disposed between the first film and the second film. An internal coolant circuit can be formed between the first and second films and configured for circulating the second cooling fluid through the liquid panel assembly. A desiccant cooling circuit can be formed between the first film and the membrane and configured for circulating the first cooling fluid through the liquid panel assembly.

Example 33 provides the method of Example 32 optionally configured such that the support structure of the panel frame comprises a plurality of horizontal and vertical members, and each of the horizontal members intersects with each of the vertical members.

Example 34 provides the method of Example 32 or 33 optionally configured such that attaching a membrane to the first film comprises forming a second support structure on an external side of the first film, the second support structure configured to provide channels for flow of the first cooling fluid between the membrane and the first film.

Example 35 provides the method of any of Examples 32-34 optionally configured such that attaching a membrane to the first film includes attaching a first membrane to the first film and forming a first desiccant cooling circuit. The method can optionally further comprise attaching a second membrane to the second film, a second desiccant cooling circuit formed between the second membrane and the second film and configured for circulating the first cooling fluid through the liquid panel assembly.

Example 36 provides the method of any of Examples 32-35 optionally configured such that the first and second films are formed of one or more polymers, and a thickness of each of the first and second films is between about 0.025 mm and about 1.0 mm.

Example 37 provides a liquid panel assembly comprising a support frame comprising a first fluid circuit configured to receive a first cooling fluid configured for conditioning an air stream and circulate the first cooling fluid from an inlet channel to an outlet channel, and a plurality of tubes, each tube oriented generally in a vertical direction on the support frame and configured to circulate a second cooling fluid through a passage of the tube. A portion of each tube is located within the first fluid circuit and the first cooling fluid flows around each tube. The second cooling fluid is configured to absorb or reject heat from the first cooling fluid. The liquid panel assembly comprises at least one membrane secured to the support frame. The first cooling fluid is configured to contact an interior surface of the at least one membrane when the first cooling fluid is circulated from the inlet channel to the outlet channel.

Example 38 provides the liquid panel assembly of Example 37 optionally configured such that horizontal members of the support frame are molded to and around the plurality of tubes.

Example 39 provides the liquid panel assembly of Example 37 or 38 optionally configured such that the first cooling fluid flows in a horizontal direction across the support frame.

Example 40 provides the liquid panel assembly of any of Examples 37-39 optionally configured such that the tubes are formed of metal.

Example 41 provides the liquid panel assembly of any of Examples 37-40 optionally configured such that the second cooling fluid is a high pressure refrigerant.

Example 42 provides the liquid panel assembly of any of Examples 37-41 optionally configured such that the at least one membrane includes a first membrane secured to a first side of the support frame and a second membrane secured to a second side of the support frame opposite the first side. At least a portion of the first fluid circuit is contained by the first and second membranes.

Example 43 provides the liquid panel assembly of any of Examples 37-42 optionally further comprising a first manifold configured to transport the second cooling fluid to each tube at a top of the liquid panel assembly, and a second manifold configured to transport the second cooling fluid from each tube at a bottom of the liquid panel assembly.

Example 44 provides a method of operating an energy exchange system and can comprise providing a plurality of liquid panel assemblies, spacing each of the liquid panel assemblies from one another to create a plurality of air channels, flowing a first cooling fluid through a first fluid circuit in each of the plurality of liquid panel assemblies, flowing a second cooling fluid through a plurality of tubes arranged vertically within each of the plurality of liquid panel assemblies, and directing an air stream through the plurality of air channels. The plurality of tubes are located within at least a portion of the first fluid circuit. The air stream contacts at least one exterior surface of each of the plurality of liquid panel assemblies. The method can further comprise conditioning the air stream using the first cooling fluid and conditioning the first cooling fluid using the second cooling fluid.

Example 45 provides a method of forming a liquid panel assembly configured to circulate a first cooling fluid and a second cooling fluid through the liquid panel assembly, and can comprise providing a plurality of tubes, each tube having a hollow interior from a top to a bottom of the tube, and arranging the plurality of tubes such that the tubes are parallel to and spaced apart from one another. The method can further comprise forming a support structure around the plurality of tubes, the support structure integral with or attached to a panel frame, each of the plurality of tubes arranged generally vertically on the panel frame. The method can further comprise forming a first fluid circuit for the first cooling fluid with the panel frame and the support structure, forming a second fluid circuit for the second cooling fluid, the second fluid circuit including passage of the second cooling fluid through the plurality of tubes, and attaching at least one membrane to the panel frame. The first cooling fluid is configured to contact an interior surface of the at least one membrane when the first cooling fluid is circulating through the first fluid circuit.

Example 46 provides the method of Example 45 optionally configured such that forming a support structure around the plurality of tubes includes forming a plurality of horizontal support members arranged generally perpendicular to the plurality of tubes.

Example 47 provides the method of Example 45 or 46 optionally configured such that the plurality of tubes are formed of metal and the plurality of horizontal support members are formed of one or more polymers.

Example 48 provides the method of any of Examples 45-47 optionally configured such that attaching at least one membrane to the panel frame comprises attaching a first membrane to a first side of the panel frame and attaching a second membrane to a second side of the panel frame opposite the first side, wherein the first and second membranes are spaced apart from one another, and wherein the support structure and the plurality of tubes are disposed between the first and second membranes.

Example 49 provides a system or method of any one or any combination of Examples 1-48, which can be optionally configured such that all steps or elements recited are available to use or select from.

Various aspects of the disclosure have been described. These and other aspects are within the scope of the following claims.

What is claimed is:

1. A liquid panel assembly comprising:
   a support frame comprising:
   a first fluid circuit comprising:
      a first inlet header to supply a first cooling fluid to the liquid panel assembly; and
      a plurality of first flow channels configured to flow the first cooling fluid through the liquid panel assembly, each of the first flow channels connected to the first inlet header and having a vertical inlet channel connected to a vertical outlet channel through one or more horizontal flow passages, the first fluid circuit configured to use the first cooling fluid to condition an air stream;
   a second fluid circuit comprising:
      a second inlet header to supply a second cooling fluid to the liquid panel assembly; and
      a plurality of second flow channels configured to flow the second cooling fluid through the liquid panel assembly, each of the second flow channels connected to the second inlet header and having a vertical inlet channel connected to a vertical outlet channel through one or more horizontal flow passages, the second fluid circuit configured to use the second cooling fluid to transfer heat to or from the first cooling fluid, the second fluid circuit separate from the first fluid circuit;
   a first semi-permeable layer secured to a first side of the support frame; and
   a second semi-permeable layer secured to a second side of the support frame opposite the first side,
   wherein the vertical inlet and outlet channels of the first flow channels enable the first fluid circuit to at least partially offset hydrostatic pressure gain with friction pressure loss of the first cooling fluid to reduce pressure within the liquid panel assembly.

2. The liquid panel assembly of claim 1 wherein the first and second semi-permeable layers facilitate heat and vapor transfer through the first and second semi-permeable layers.

3. The liquid panel assembly of claim 1 further comprising:
   a first film attached to the first side of the support frame and positioned between the support frame and the first semi-permeable layer, a first space between the first film and the first semi-permeable layer forming a first portion of the first fluid circuit; and
   a second film attached to the second side of the support frame and positioned between the support frame and the second semi-permeable layer, a second space between the second film and the second semi-permeable layer forming a second portion of the first fluid circuit.

4. The liquid panel assembly of claim 3 wherein the second fluid circuit is received through a third space formed between the first and second films.

5. The liquid panel assembly of claim 4 wherein the vertical inlet and outlet channels of the second flow channels enable the second fluid circuit to at least partially offset hydrostatic pressure gain with friction pressure loss of the second cooling fluid to reduce pressure within the liquid panel assembly.

6. The liquid panel assembly of claim 3 wherein each of the first and second films have a thickness ranging between about 0.025 mm and about 1 mm.

7. An energy exchange system comprising:
a plurality of air channels configured to allow air to pass therethrough; and
a plurality of liquid panel assemblies alternately spaced with the plurality of air channels, each of the plurality of liquid panel assemblies comprising:
a first inlet header configured to supply a first cooling fluid to the liquid panel assembly;
a first desiccant channel connected to the first inlet header and comprising a plurality of flow channels configured to flow the first cooling fluid through the liquid panel assembly, each of the flow channels having a vertical inlet channel connected to a vertical outlet channel through one or more horizontal flow passages;
a second desiccant channel connected to the first inlet header and comprising a plurality of flow channels configured to flow the first cooling fluid through the liquid panel assembly, each of the flow channels having a vertical inlet channel connected to a vertical outlet channel through one or more horizontal flow passages;
a second inlet header configured to supply a second cooling fluid to the liquid panel assembly;
a coolant channel connected to the second inlet header and comprising a plurality of flow channels configured to flow the second cooling fluid through the liquid panel assembly, each of the flow channels having a vertical inlet channel connected to a vertical outlet channel through one or more horizontal flow passages, the coolant channel disposed between the first and second desiccant channels, the first fluid circuit separate from the second fluid circuit; and
a support frame comprising a plurality of horizontal support members and a plurality of vertical support members; and
one or more sealing members secured to the support frame, an interior surface of the one or more sealing members in contact with the first cooling fluid or the second cooling fluid, and an exterior surface of the one or more sealing members in contact with an adjacent air channel of the plurality of air channels,
wherein the vertical inlet and outlet channels of the first and second desiccant channels enable the first fluid circuit to at least partially offset hydrostatic pressure gain with friction pressure loss of the first cooling fluid to reduce pressure within the liquid panel assembly.

8. The energy exchange system of claim 7 further comprising a plurality of membrane support assemblies disposed within the plurality of air channels.

9. The energy exchange system of claim 7 wherein air within the plurality of air channels is configured to counterflow with respect to the first cooling fluid in the first fluid circuit.

10. The energy exchange system of claim 7 wherein the one or more sealing members includes:
a first vapor permeable layer secured to a first side of the support frame; and
a second vapor permeable layer secured to a second side of the support frame opposite the first side.

11. The energy exchange system of claim 10 further comprising:
a first film sealed to the first side of the support frame and positioned between the support frame and the first vapor permeable layer; and
a second film sealed to the second side of the support frame and positioned between the support frame and the second vapor permeable layer,
wherein the first fluid circuit includes a first space between the first film and the first vapor permeable layer and a second space between the second film and the second vapor permeable layer.

12. The liquid panel assembly of claim 1 wherein a direction of flow of the first cooling fluid in the one or more horizontal flow passages of the first fluid circuit is parallel to a direction of flow of the second cooling fluid in the one or more horizontal flow passages of the second fluid circuit.

13. The liquid panel assembly of claim 1 wherein a direction of flow of the first cooling fluid in the one or more horizontal flow passages of the first fluid circuit is counter to a direction of flow of the second cooling fluid in the one or more horizontal flow passages of the second fluid circuit.

14. The energy exchange system of claim 7 wherein a direction of flow of the first cooling fluid in the one or more horizontal flow passages of the first fluid circuit in the first and second desiccant channels is parallel to a direction of flow of the second cooling fluid in the one or more horizontal flow passages of the second fluid circuit of the coolant channel.

15. The energy exchange system of claim 7 wherein a direction of flow of the first cooling fluid in the one or more horizontal flow passages of the first fluid circuit in the first and second desiccant channels is counter to a direction of flow of the second cooling fluid in the one or more horizontal flow passages of the second fluid circuit of the coolant channel.

16. A liquid panel assembly comprising:
a support frame comprising:
a first fluid circuit having an inlet channel connected to an outlet channel through one or more flow passages, the first fluid circuit configured to receive a first cooling fluid to condition an air stream;
a second fluid circuit having an inlet and an outlet and configured to receive a second cooling fluid to transfer heat to or from the first cooling fluid, the second fluid circuit separate from the first fluid circuit;
a first semi-permeable layer secured to a first side of the support frame;
a second semi-permeable layer secured to a second side of the support frame opposite the first side;
a first film attached to the first side of the support frame and positioned between the support frame and the first semi-permeable layer, a first space between the first film and the first semi-permeable layer forming a first portion of the first fluid circuit; and
a second film attached to the second side of the support frame and positioned between the support frame and the second semi-permeable layer, a second space between the second film and the second semi-permeable layer forming a second portion of the first fluid circuit,
wherein the first fluid circuit is configured to at least partially offset hydrostatic pressure gain with friction pressure loss of the first cooling fluid to reduce pressure within the liquid panel assembly.

17. The liquid panel assembly of claim 16 wherein the second fluid circuit is received through a third space formed between the first and second films.

18. The liquid panel assembly of claim 17 wherein the second fluid circuit is configured to at least partially offset hydrostatic pressure gain with friction pressure loss of the second cooling fluid to reduce pressure within the liquid panel assembly.

19. The liquid panel assembly of claim 16 wherein each of the first and second films have a thickness ranging between about 0.025 mm and about 1 mm.

* * * * *